(12) United States Patent
Walker et al.

(10) Patent No.: US 9,160,511 B2
(45) Date of Patent: Oct. 13, 2015

(54) CYCLIC PREFIX IN EVOLVED MULTIMEDIA BROADCAST MULTICAST SERVICE WITH HIGH TRANSMIT POWER

(71) Applicant: QUALCOMM Incorporated, San Diego, CA (US)

(72) Inventors: Gordon Kent Walker, Poway, CA (US); Jun Wang, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/752,332

(22) Filed: Jan. 28, 2013

(65) Prior Publication Data

US 2013/0195002 A1    Aug. 1, 2013

Related U.S. Application Data

(60) Provisional application No. 61/592,582, filed on Jan. 30, 2012, provisional application No. 61/593,834, filed on Feb. 1, 2012.

(51) Int. Cl.
*H04L 5/00* (2006.01)
*H04L 27/26* (2006.01)
(Continued)

(52) U.S. Cl.
CPC ............ *H04L 5/005* (2013.01); *H04L 27/2607* (2013.01); *H04L 27/2646* (2013.01); *H04W 4/00* (2013.01); *H04W 56/00* (2013.01); *H04L 5/001* (2013.01); *H04W 72/00* (2013.01)

(58) Field of Classification Search
CPC . H04L 27/00; H04L 27/2678; H04L 27/2695; H04L 27/2646; H04L 27/2607; H04L 5/005; H04L 5/001; H04W 4/00; H04W 56/00; H04W 72/00
See application file for complete search history.

(56) References Cited

U.S. PATENT DOCUMENTS 8,077,801 B2    12/2011  Malladi
8,218,496 B2     7/2012  Bertrand et al.
(Continued)

FOREIGN PATENT DOCUMENTS

WO    2008097038 A2    8/2008
WO    2008101762 A1    8/2008
WO    2009095369 A1    8/2009

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V1 0.4.0, Dec. 12, 2011, pp. 1-101, XP050555010.
(Continued)

*Primary Examiner* — Ajay Cattungal
(74) *Attorney, Agent, or Firm* — Arent Fox LLP

(57) ABSTRACT

A method, an apparatus, and a computer program product for wireless communication are provided in which a cyclic prefix duration for orthogonal frequency division multiple access symbols is determined. The cyclic prefix duration is calculated to reduce inter-symbol interference associated with a transmitter located at a distance that is more than 5 kilometers from one or more user equipment. Subcarrier spacing is determined and a symbol size for the symbols is determined. One or more of an enhanced Node B and a user equipment is configured with the cyclic prefix duration, the subcarrier spacing and the symbol size.

45 Claims, 16 Drawing Sheets

(51) Int. Cl.
*H04W 4/00* (2009.01)
*H04W 56/00* (2009.01)
*H04W 72/00* (2009.01)

(56) References Cited

U.S. PATENT DOCUMENTS

| | | | |
|---|---|---|---|
| 8,565,082 B1 * | 10/2013 | Vargantwar et al. | 370/230 |
| 2008/0084845 A1 | 4/2008 | Kuchibhotla et al. | |
| 2009/0122771 A1 * | 5/2009 | Cai | 370/338 |
| 2009/0312008 A1 | 12/2009 | Lindoff et al. | |
| 2011/0026649 A1 * | 2/2011 | Lipka et al. | 375/343 |
| 2012/0213143 A1 | 8/2012 | Zhang et al. | |
| 2012/0257553 A1 * | 10/2012 | Noh et al. | 370/280 |

OTHER PUBLICATIONS

International Search Report and Written Opinion—PCT/US2013/023674—ISA/EPO—May 7, 2013.

* cited by examiner

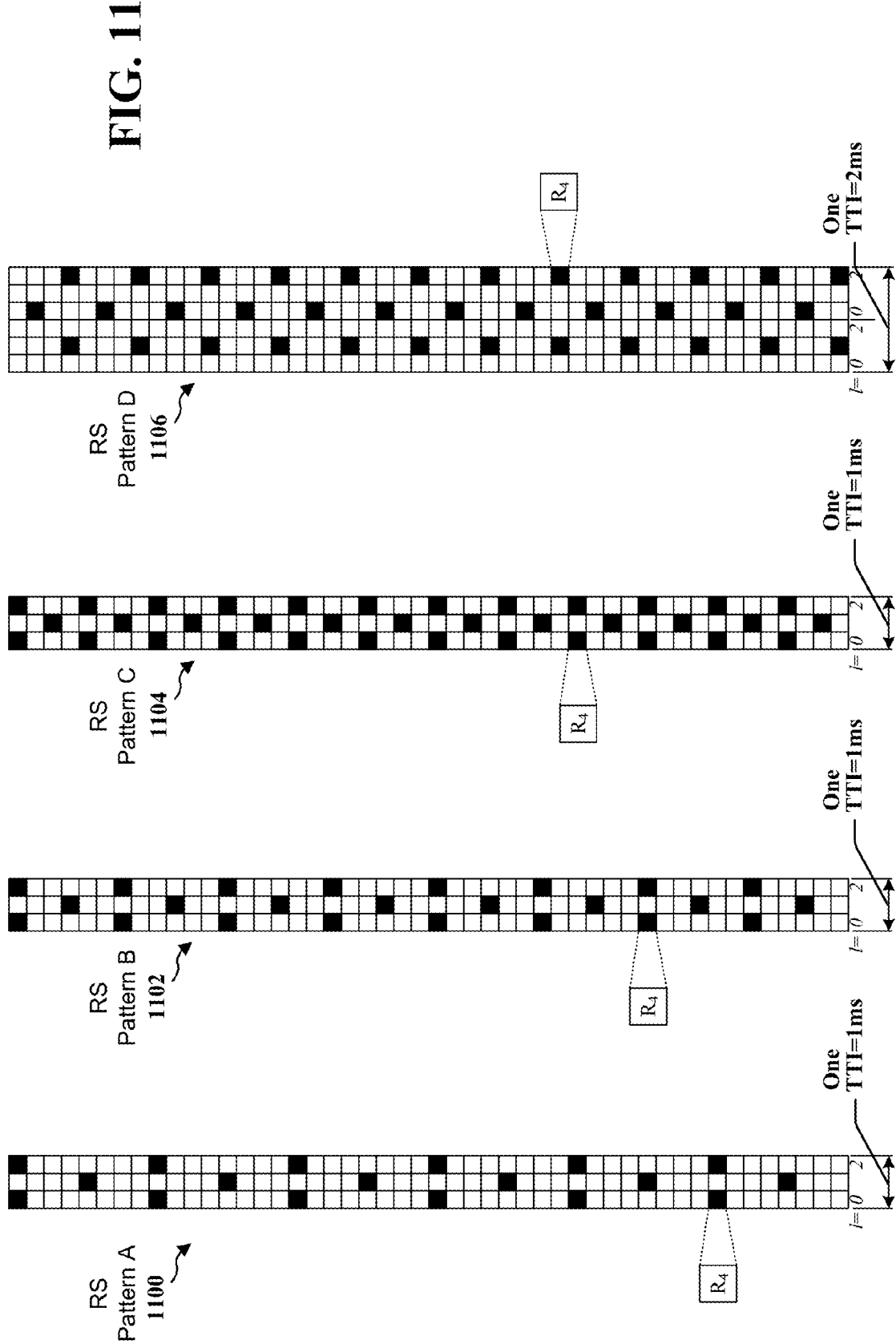

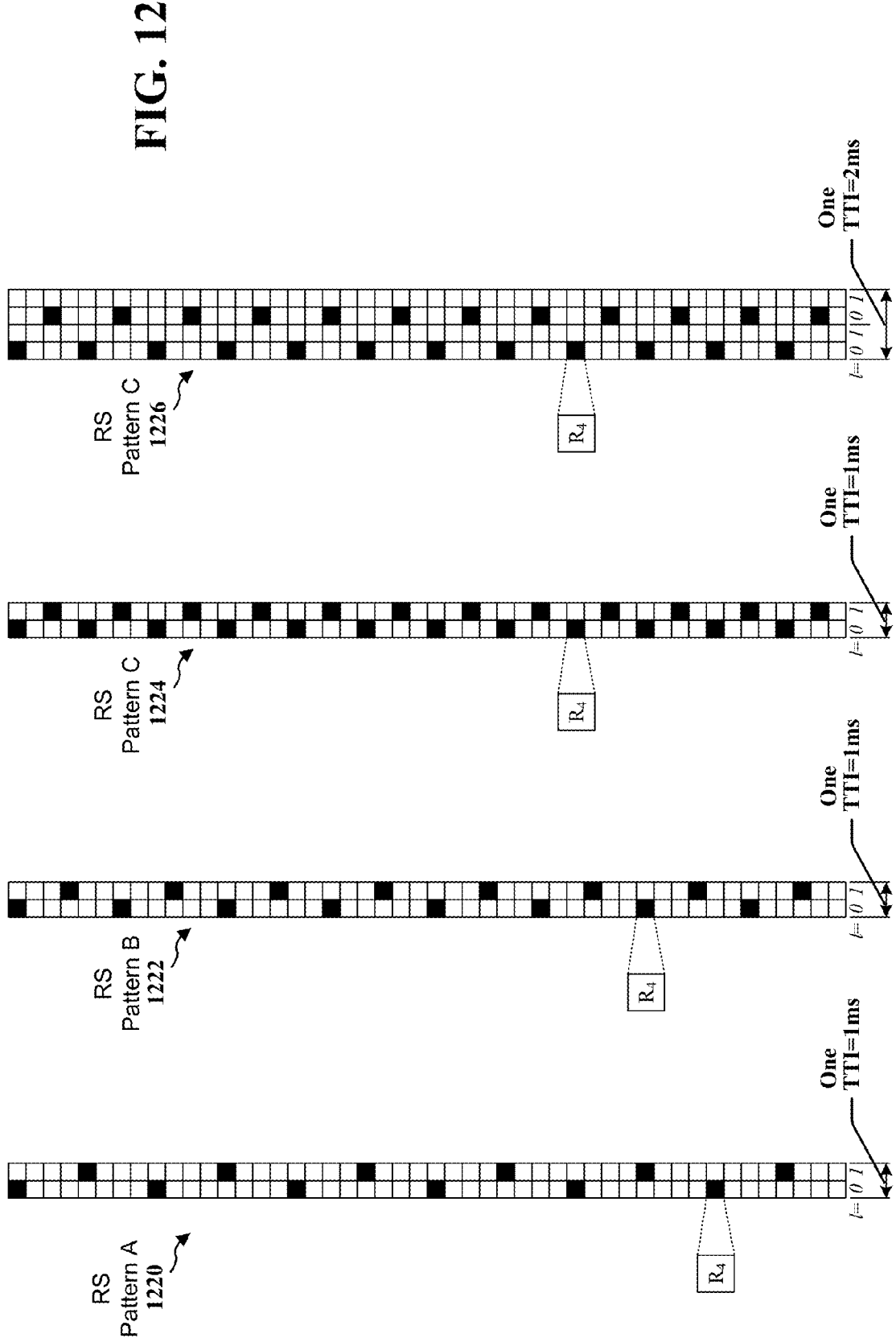

CYCLIC PREFIX IN EVOLVED MULTIMEDIA BROADCAST MULTICAST SERVICE WITH HIGH TRANSMIT POWER

CROSS-REFERENCE TO RELATED APPLICATIONS

This application claims the benefit of U.S. Provisional Application Ser. No. 61/592,582, entitled "Cyclic Prefix In Evolved Multimedia Broadcast Multicast Service With High TX Power," and filed on Jan. 30, 2012, and claims the benefit of U.S. Provisional Application Ser. No. 61/593,834, entitled "Cyclic Prefix In Evolved Multimedia Broadcast Multicast Service With High TX Power," and filed on Feb. 1, 2012, which are expressly incorporated by reference herein in their entirety.

BACKGROUND

1. Field

The present disclosure relates generally to communication systems, and more particularly, to wireless communication systems with evolved multimedia broadcast multicast service.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be configured to determine a cyclic prefix (CP) duration for orthogonal frequency division multiple access OFDMA symbols to be transmitted wirelessly in a multi-media broadcast over a single frequency network (MBSFN) area. The CP duration is calculated to accommodate a propagation delay between an evolved Node B (eNB) and one or more user equipment (UE) or other eNBs in the MBSFN that has a duration that exceeds a predefined duration.

In an aspect of the disclosure, the apparatus may be configured to determine a subcarrier spacing for the MBSFN and determine a transmission time interval (TTI) corresponding to a subframe transmitted in the MBSFN. In an aspect of the disclosure, the apparatus may be further configured to provide one or more of the eNB and the UE with a distribution pattern for reference signals in the subframe based on the cyclic prefix duration, the subcarrier spacing, and the TTI. In an aspect of the disclosure, a symbol duration for the OFDMA symbols may be determined. The distribution pattern may be based on the symbol duration. The distribution pattern may be based on separation between neighboring reference signals within the subframe. In an aspect of the disclosure, a plurality of eNBs may be configured with the distribution pattern. The eNBs may participate in the same MBSFN. In an aspect of the disclosure, the duration of the cyclic prefix is greater than 33 µs. The cyclic prefix duration may be selected to reduce inter-symbol interference associated with the propagation delay. The cyclic prefix may be determined based on a maximum propagation path length between a first eNB in the MBSFN and one or more of a second eNB and the UE. In an aspect of the disclosure, the subcarrier spacing is less than 7.5 kHz. In an aspect of the disclosure, the TTI is 1 ms when the subcarrier spacing is 7.5 MHz or more. In an aspect of the disclosure, the TTI is greater than 1 ms when the subcarrier spacing is less than 7.5 kHz. In an aspect of the disclosure, the cyclic prefix is determined based on transmission power of an eNB associated with the maximum propagation path length. In an aspect of the disclosure, configuring a symbol size includes reducing bandwidth to obtain a sustainable FFT size. In an aspect of the disclosure, one or more of the subcarrier spacing and the symbol size are configured to obtain a predetermined Doppler resistance. The predetermined Doppler resistance may be calculated based on a maximum expected velocity of a moving UE traversing the MBSFN.

In an aspect of the disclosure, a method, a computer program product, and an apparatus are provided. The apparatus determines configuration information for a subframe to be wirelessly transmitted in an MBSFN. The configuration information defines a distribution pattern for reference signals in the subframe. The distribution pattern is based on a cyclic prefix duration for OFDMA symbols to be transmitted wirelessly in the MBSFN, a subcarrier spacing for the MBSFN, and a TTI corresponding to the subframe. The apparatus transmits the distribution pattern to at least one UE in the MBSFN. The apparatus transmits at least one subframe to the UE in accordance with the distribution pattern.

In an aspect of the disclosure, a method, a computer program product, and an apparatus are provided. The apparatus determines configuration information for a subframe to be wirelessly transmitted in an MBSFN. The configuration information defines a distribution pattern for reference signals in the subframe. The distribution pattern is based on a cyclic prefix duration for OFDMA symbols to be transmitted wirelessly in the MBSFN, a subcarrier spacing for the MBSFN, and a TTI corresponding to the subframe. The apparatus receives at least one subframe in accordance with the distribution pattern.

BRIEF DESCRIPTION OF THE DRAWINGS

FIG. 11 is a diagram illustrating resource element assignments for MBSFN reference signal transmission when subcarrier spacing is reduced below 7.5 kHz.

FIG. 12 is a diagram illustrating resource element assignments for MBSFN reference signal transmission when subcarrier spacing is reduced below 7.5 kHz.

DETAILED DESCRIPTION

Figure 1:
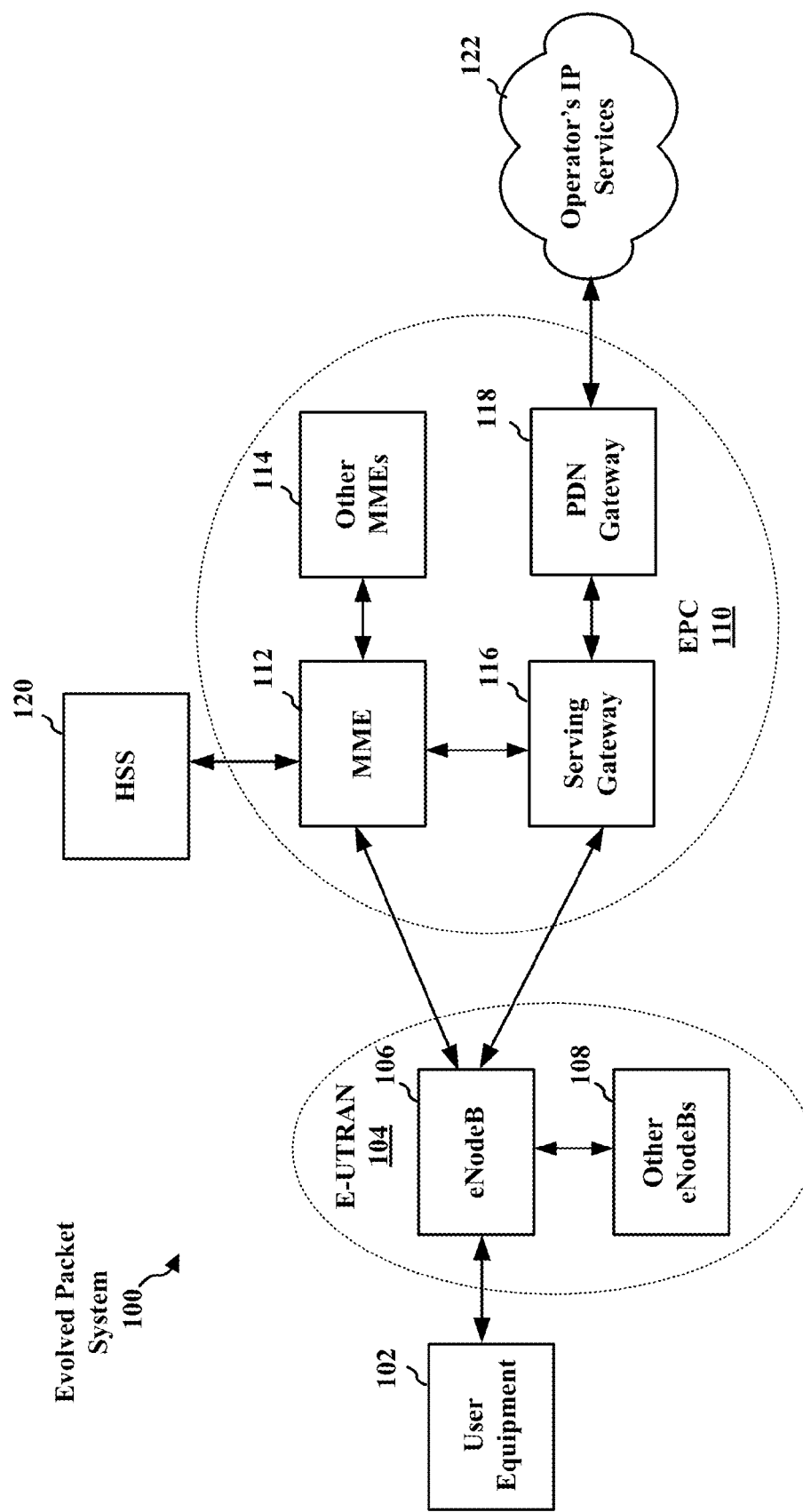
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the eNB 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS). In an MBMS radio access network, Broadcast/Multicast Service Center (BM-SC) 126 may serve as a portal or entry point for content providers and may provide certain authorization and other services. Broadcast/Multicast Management Entity (BME) 124 may be configured to receive, process, and/or forward control signaling, and may be used to select an eNB 106 or 108 to receive MBMS control signaling.

Figure 2:
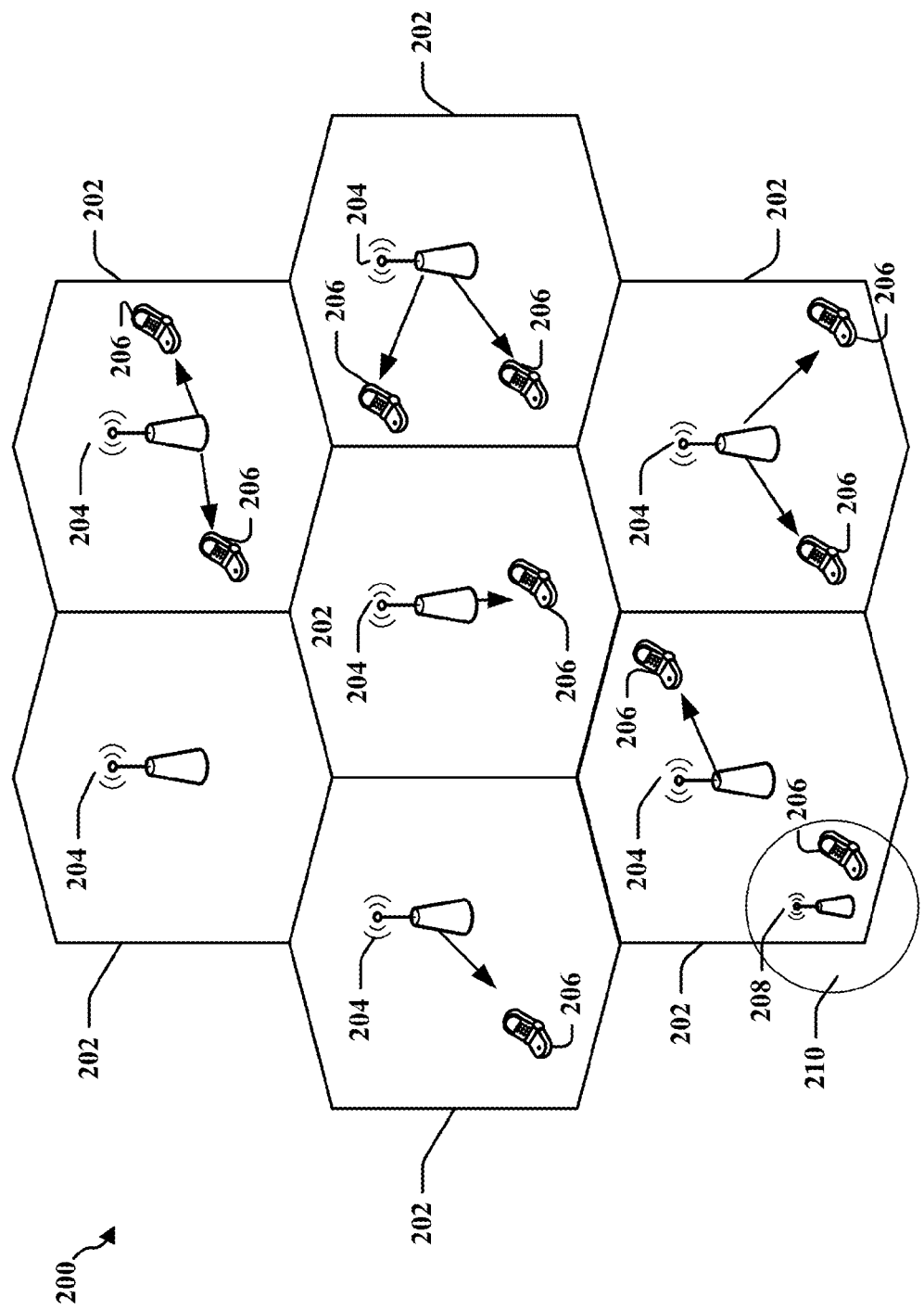
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDMA symbol. The subcarriers are spaced apart at precise frequencies. The spacing provides "orthogonality" that enables a receiver to recover the data from the subcarriers. In the time domain, a guard interval such as a CP may be added to each OFDMA symbol to combat inter-OFDM-symbol interference. The UL may use SC-FDMA in the form of a DFT-spread OFDM signal to compensate for high peak-to-average power ratio (PAPR).

Figure 3:
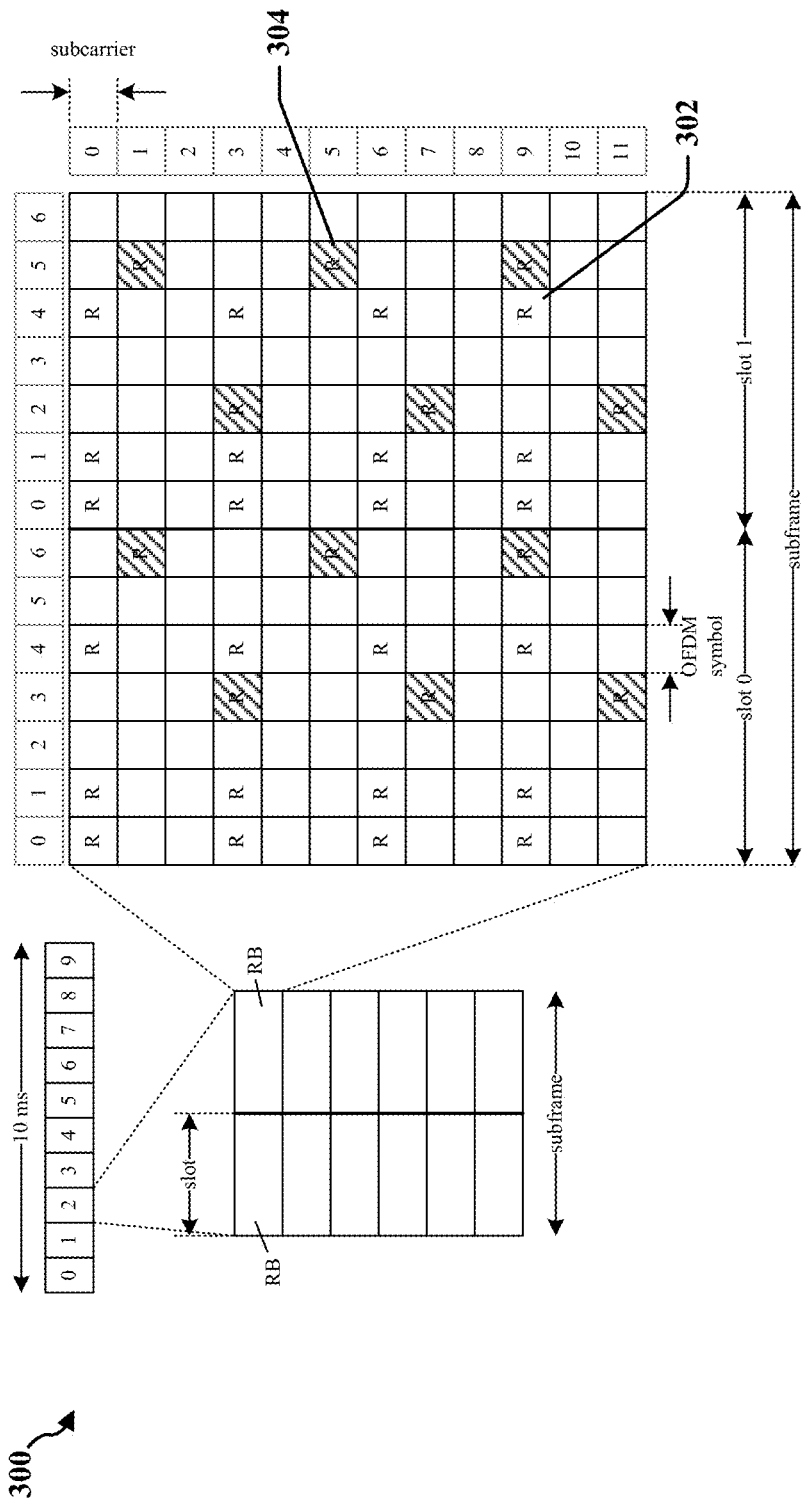
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal CP in each OFDMA symbol, 7 consecutive OFDMA symbols in the time domain, or 84 resource elements. For an extended CP, a resource block contains 6 consecutive OFDMA symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
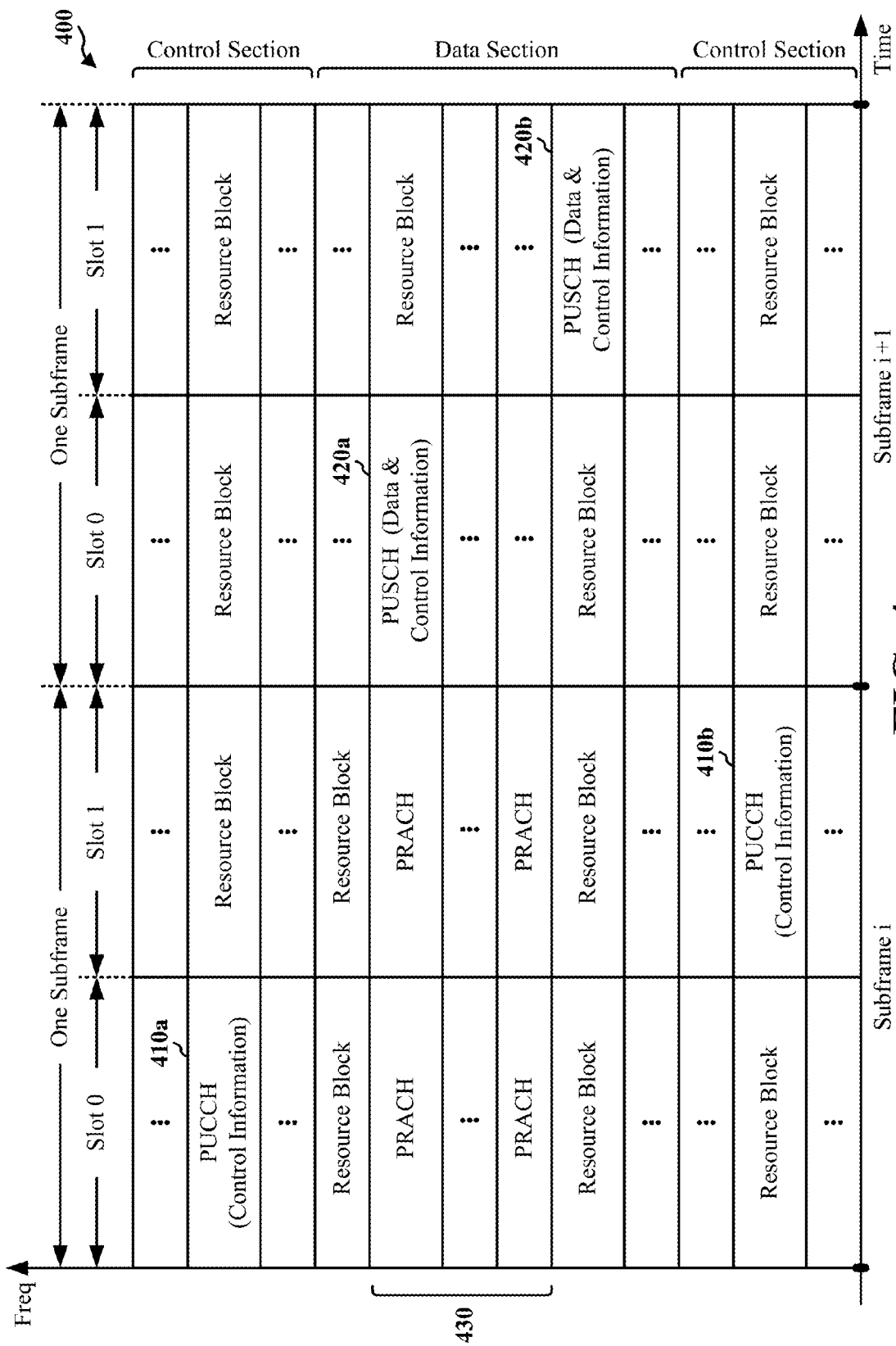
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size.

The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
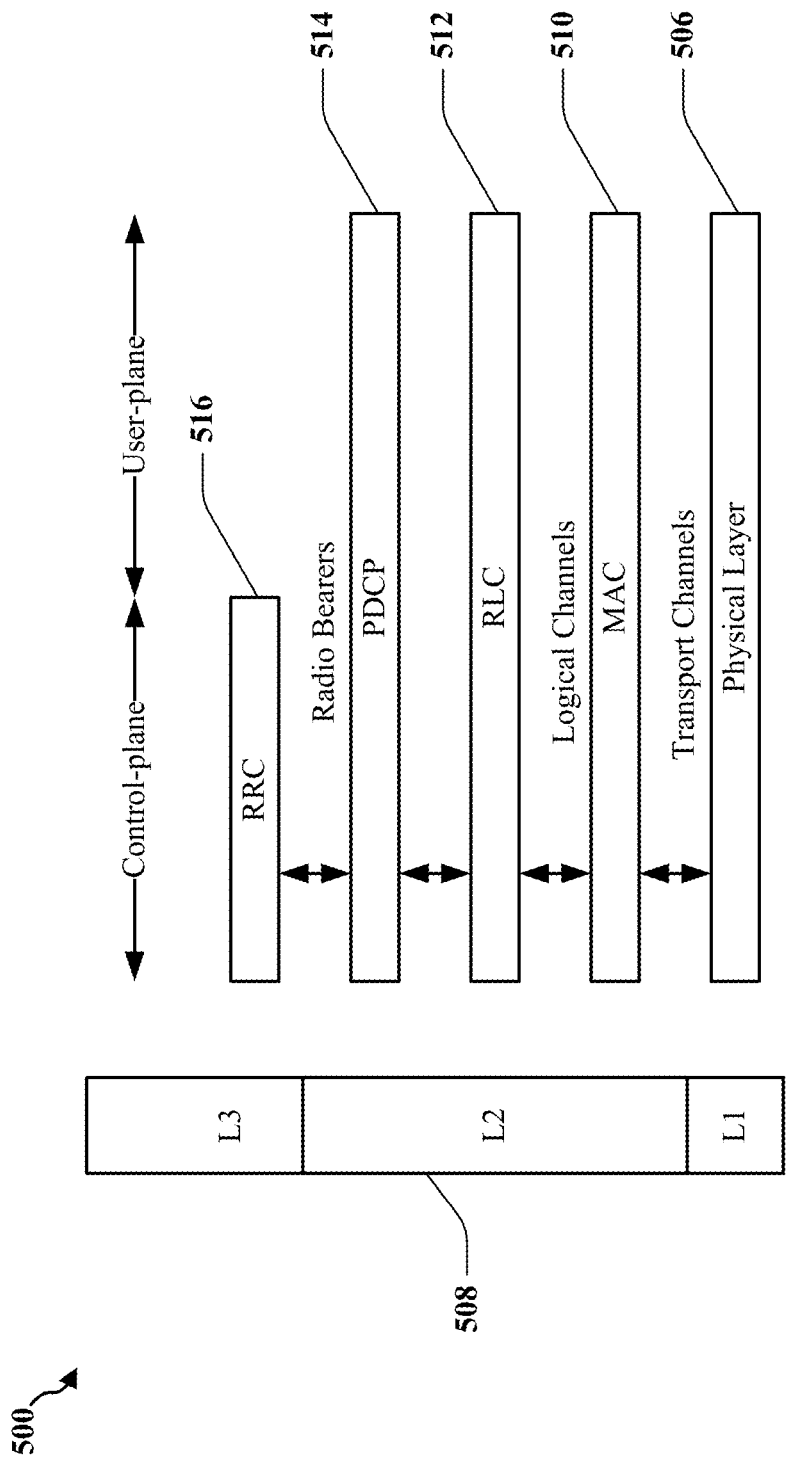
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
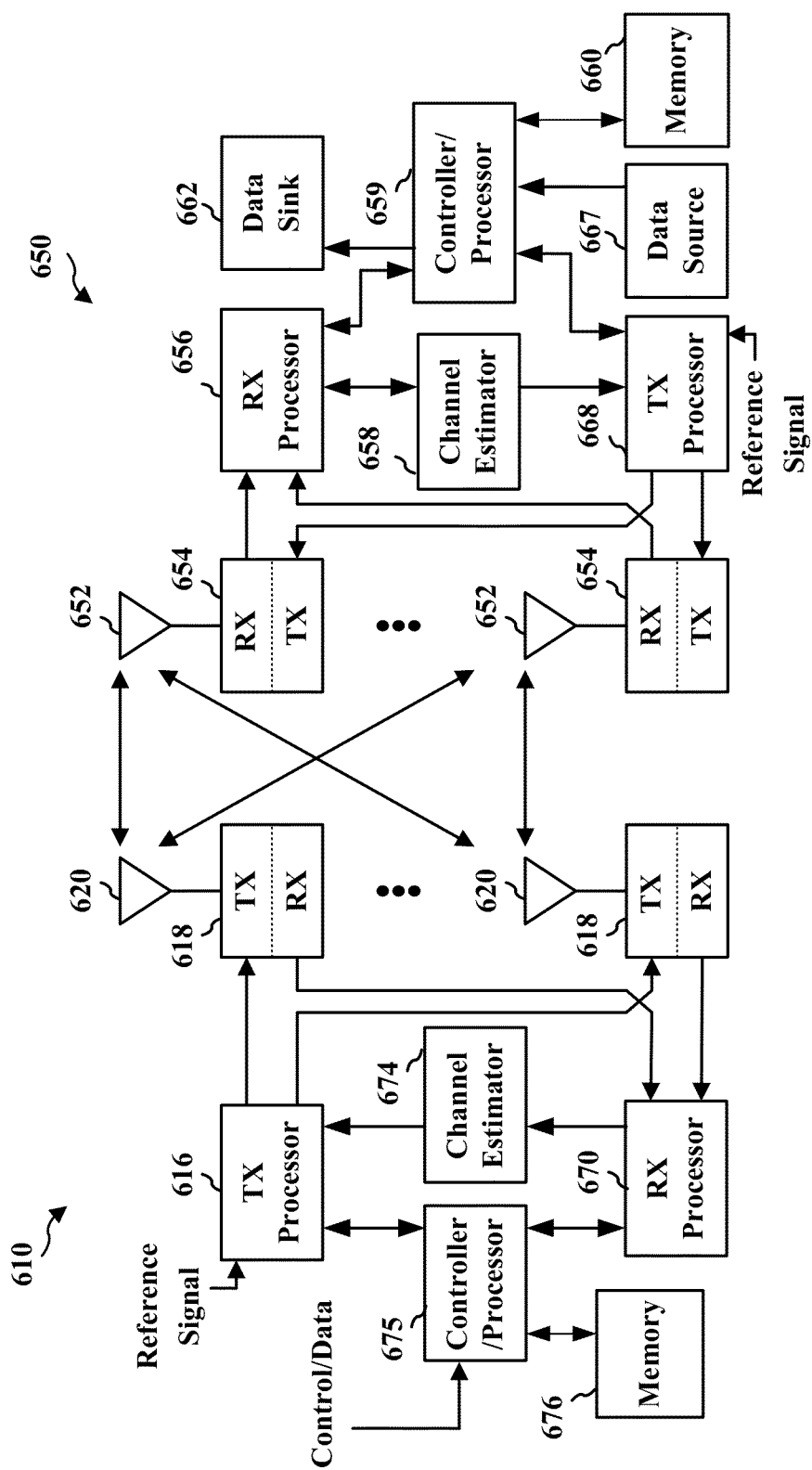
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDMA symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDMA symbol stream. The RX processor 656 then converts the OFDMA symbol stream from the time-domain to the frequency domain using a Fast Fourier Transform (FFT). The frequency domain signal comprises a separate OFDMA symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
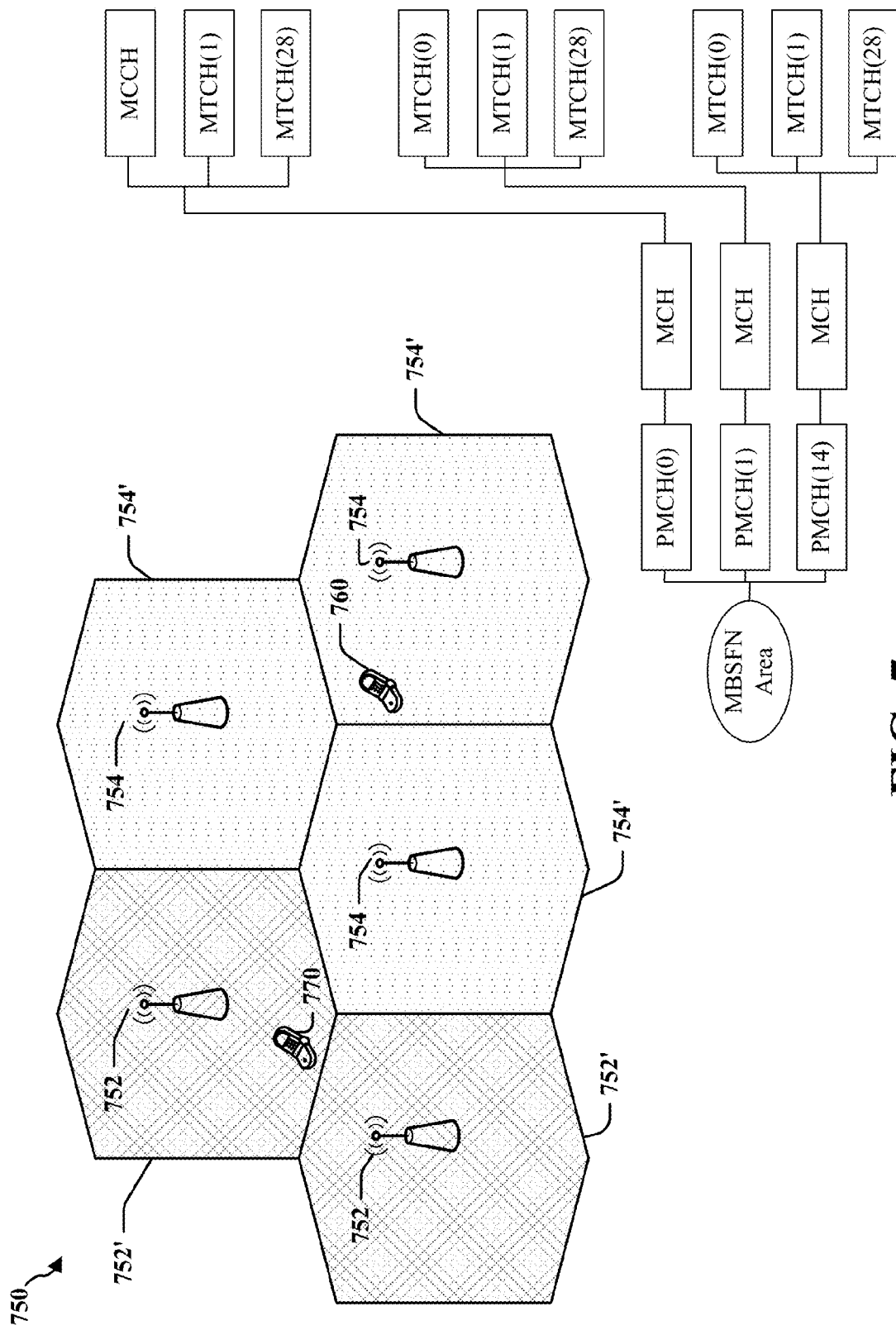
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in an MBSFN. The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data in a synchronized manner. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
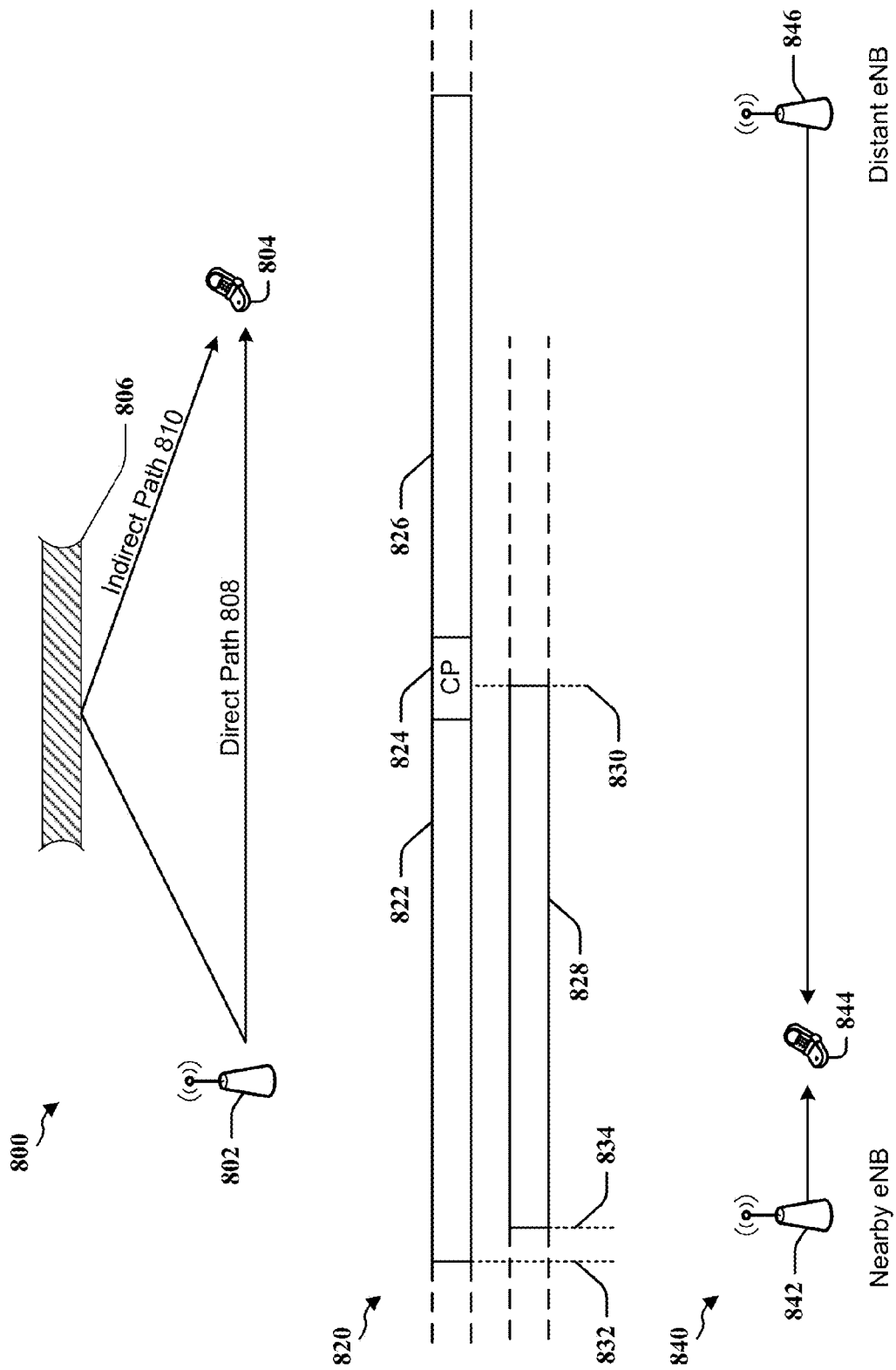
FIG. 8 is a diagram illustrating the propagation delay spread.

A CP is added to the beginning of ODFM symbols to provide a guard interval for suppressing inter-OFDM-symbol interference and to maintain orthogonality between subcarriers. Inter-symbol interference may occur because of time-dispersive channel issues caused by the existence of multiple communications paths within the channel between, for example, an eNB and a UE. FIG. 8 is diagram illustrating example scenarios 800 and 840 that may give rise to inter-symbol interference. FIG. 8 also includes a timing chart 820 illustrating the effect of propagation delays, as observed at UE 804. Example scenario 800 relates to a single eNB 802 that communicates with UE 804. A symbol 822 received at UE 804 from eNB 802 travels by a direct propagation path 808 and a delayed version of symbol 822 arrives as delayed symbol 828 from a longer, indirect propagation path 810 created, for example, by a reflection at object 806, which may be a building. If the difference in time of arrival 832 of symbol 822 and time of arrival 834 of delayed symbol 828 is less than the CP duration, then no inter-symbol interference occurs and symbols 822 and 828 may be combined at the UE 804. In the depicted example, the duration of CP 824 is long enough to prevent inter-symbol interference between delayed symbol 828, which ends at time 830, and next symbol 826. The difference between the time of arrival 832 of symbol 822 at UE 804 through direct path 808 and the time of arrival 834 of delayed symbol 828 at UE 804 may be referred to as the delay spread of scenario 800, particularly where indirect path 810 is the longest indirect propagation path available between eNB 802 and UE 804. An indirect path may have the longest propagation path length and/or delay associated with eNB 802 and UE 804.

Timing chart 820 may also be representative of an eMBMS scenario 840 in which eNB 842 and eNB 846 may be located at significantly different distances from UE 844 or may transmit along one or more propagation paths that have significantly different lengths. As a result, symbol 822 and delayed symbol 828, which are transmitted in a synchronous manner by eNBs 842 and 846 respectively, may arrive at different times at UE 844. As depicted in timing chart 820, inter-symbol interference may be averted if the end of delayed symbol 828 occurs during the duration of CP 824 of the next symbol 826 received at the UE 844. Symbols 822 and 828 arriving by different propagation paths may be combined at the UE 804 if the delay spread between the symbols 822 and 828 is less than the CP duration. The difference between the time of arrival 832 of symbol 822 at UE 844 by shortest propagation path (here, nearby eNB 842) and the time of arrival 834 of symbol 828 from distant eNB 846 at UE 844 may be referred to as the delay spread of eMBMS scenario 840. The delay spread for eMBMS scenario 840 is typically calculated using the arrival time 832 associated with the shortest propagation path length between an eNB 842 or 846 and UE 844, which may correspond to the direct path 808 from the closest eNB 842, and the arrival time 834 associated with the longest propagation path length between an eNB 842 or 846 and UE 844, which may correspond to the longest indirect path 810 in the MBSFN area, typically from the most distant eNB 846. The longest propagation path length may also be associated with an eNB 846 that is closer than a more distant eNB 846 when a longer indirect propagation path exists between closer eNB 842 and UE 844.

LTE defines an extended CP that may be used for eMBMS instead of a normal CP, particularly when an MBSFN area comprises large cells that produce correspondingly large delay spread. The duration of the extended CP may be 16.7 μs for LTE, whereas the duration of the normal CP may be 4.7 or 5.1 μs, for example. In eMBMS, the CP 824 may be required to cover timing differences of transmissions received from different eNBs 842, 846 in an MBSFN. A UE 844 in an MBSFN may receive signals from a nearby eNB 842 that has transmission power in the range of 10 to 40 watts and from a distant eNB 846 that has a higher transmission power, e.g. 80 kW or more, and has propagation path lengths to the UE 842 that are relatively long (e.g. lengths up to and beyond 20 kilometers (km)). A longer CP duration may be used to allow signals from both eNBs 842 and 846 to be combined and to avoid inter-symbol interference related longer propagation paths between UE 844 and distant eNBs 846 with high transmission power. In some embodiments, a CP duration may be used that is at least two or three times longer than the extended CP duration. CP duration as a percentage of the time required to transmit a symbol and the CP may be referred to as CP overhead. Some embodiments may increase symbol duration to compensate for effects of increased CP duration, which may include increased CP overhead.

Figure 9A:
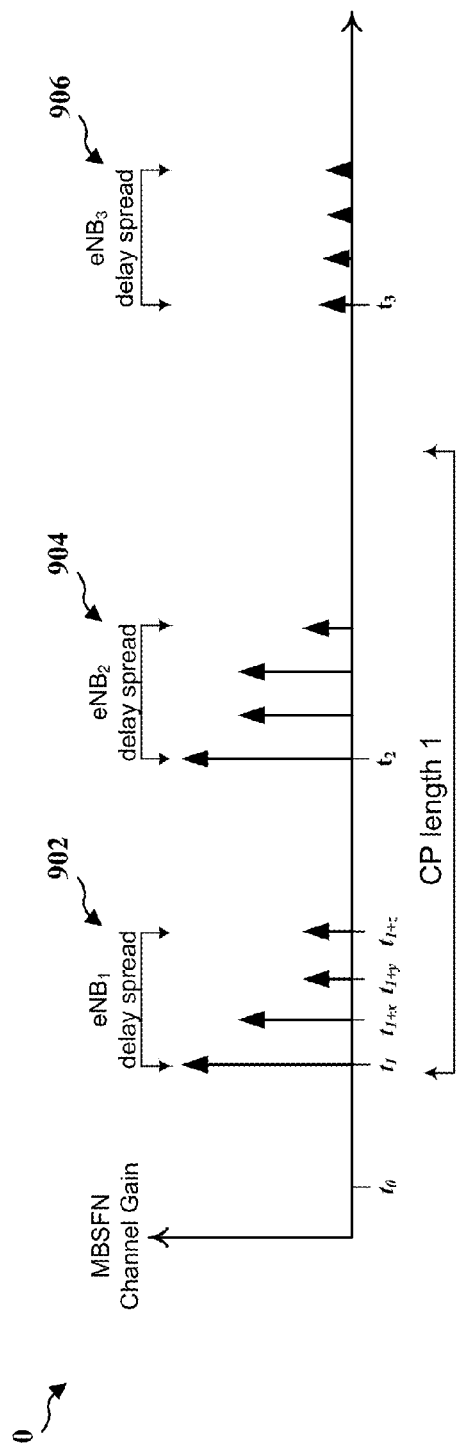
FIGS. 9A and 9B are timing diagrams illustrating propagation delay spread for multiple eNBs in an MBSFN.
Figure 9B:
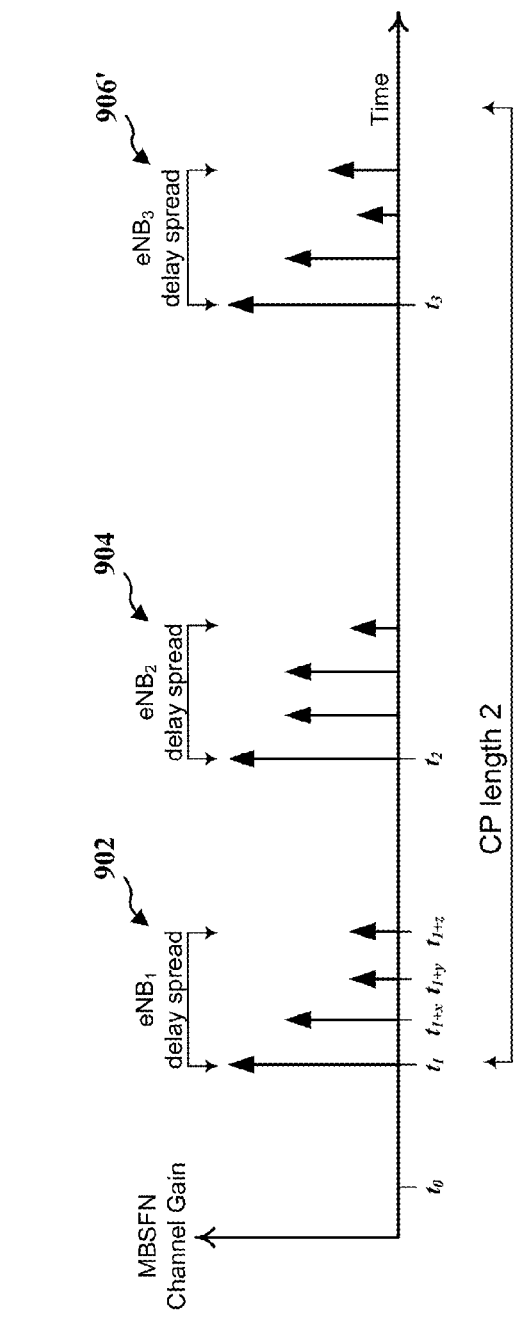

In eMBMS, there may be multiple propagation paths between each eNB and a UE and the different eNBs in an MBSFN may have propagation delays that are different from one another and attributable to their respective distances from the UE. FIGS. 9A and 9B illustrate delay spreads in an MBSFN area in more detail. FIGS. 9A and 9B relate to an exemplary MBSFN area in which three eNBs transmit the same signal information to a UE in a synchronized manner, at a time $t_0$. As depicted in timing chart 900, multiple signals are received by a UE from each of the eNBs. A first group of signals 902 is received at the UE from a first eNB, with the first signal in group 902 arriving at time $t_1$, a second group of signals 904 is received at the UE from a second eNB, with the first signal in group 904 arriving at time $t_2$, and a third group of signals 906 is received from a third eNB, with the first signal in group 906 arriving at time $t_3$. The signals in each group 902, 904, and 906 may arrive at the UE at different times and the time elapsed between $t_0$ and the arrival of the first signal of each group 902, 904 and 906, $t_1$, $t_2$, and $t_3$ respectively, may represent the minimum propagation delay for the groups 902, 904 and 906. Minimum propagation delay may correspond to the shortest propagation path between an eNB and a UE.

Timing chart 900 further illustrates that the signal transmitted by each eNB may arrive at different times at the UE because of differences in the lengths of the propagation paths between each eNB and the UE. As shown for signal group 902, delayed versions of the signal may arrive at times $t_{1+x}$, $t_{1+y}$, and $t_{1+z}$. The time elapsed between $t_1$ and $t_{1+z}$ may represent the delay spread associated with the first eNB, corresponding to different propagation paths between the first eNB and the UE. Each propagation path between an eNB and a UE may have an attenuation that is the same or different from other propagation paths between the eNB and the UE.

As depicted, the first signal of group 902 is the first signal received by the UE ($t_1$). The UE may integrate or combine one or more signals received from one or more eNBs. Signals that are delayed with respect to time $t_1$ by less than the length of the duration of CP 1 may be combined at the UE. CP 1 is the CP defined for the MBSFN of FIG. 9A. Signals that are delayed for longer than the duration of CP 1 may cause inter-symbol interference. The signals in group 906 are shown as being attenuated to a level that is close to channel noise level and these attenuated signals may not cause significant inter-symbol interference or contribute significantly to MSFN gain as seen by the UE. Accordingly, CP 1 may have a duration that is less than the relative propagation delay between groups 902 and 906 (i.e. $t_3-t_1$) and consequently, the signals of group 906 may not be coherently combined with the signals received from the first and second eNBs at the UE.

Typically, attenuation increases with propagation path length. As shown in FIG. 9A, the signals of group 906 received from the third eNB have the longest propagation delays in the illustrated MBSFN and are also most attenuated. CP length may be configured to be less than a relative propagation delay of a signal received at the UE where the relative propagation delay corresponds to a propagation path length at which the attenuation of the signal is not expected to cause significant inter-symbol interference or contribute significantly to MSFN channel gain seen at the UE. For example, the signals of group 906 are significantly attenuated and can be excluded from coherent combination at the UE when CP 1 is used.

FIG. 9B illustrates the delay spreads and attenuation for the first, second, and third eNBs in which power level of the signals received from the third eNB (group 906') are comparable to the power levels of at least some signals in the groups 902 and 904, which are received from the first and second eNBs. This parity in received signal power may be the result of an increased transmitter power output from the third eNB relative to the power output of the first and second eNBs. The increased power of the signals in group 906' may cause significant inter-symbol interference when CP length is insufficiently long to cover the propagation delays of significant signals in group 906'. Consequently, a longer CP duration may be configured for the MBSFN (CP 2) to cover the propagation delays of the signals in group 906' received from the third eNB, and thereby permit the signals of group 906' to be coherently combined with the signals received from the first and second eNBs to provide MBSFN gain at the UE.

Figure 10B:
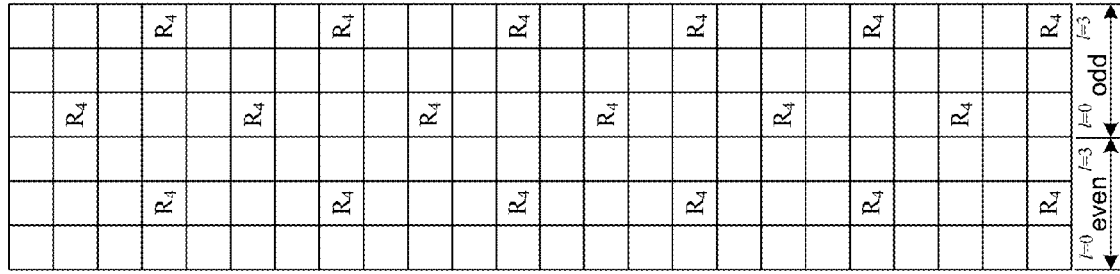
FIGS. 10A and 10B are diagrams illustrating the assignment of resource elements used for MBSFN reference signal transmission where an extended CP is used.
Figure 10A:
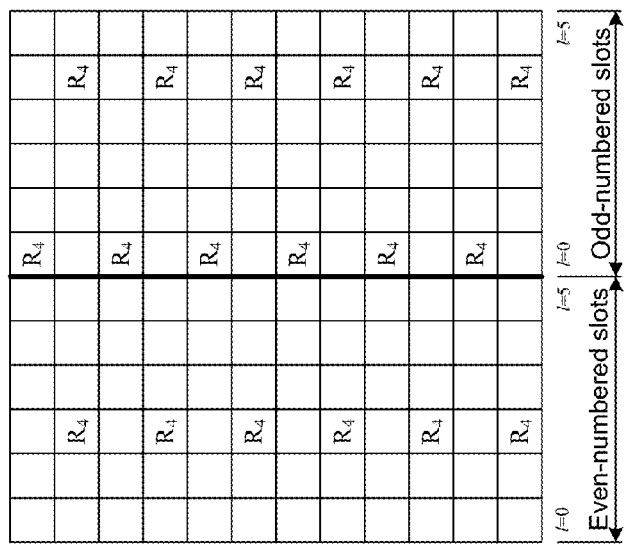

FIGS. 10A and 10B illustrate the assignment of resource elements used for MBSFN reference signal transmission where a longer CP duration is used. FIG. 10A relates to an embodiment having subcarrier spacing set to 15 kHz. MBSFN reference signals (depicted as $R_4$ resource elements for an antenna port 4) are mapped to subframe 1000 for a CP duration of approximately 16.67 μs. FIG. 10B relates to an embodiment having subcarrier spacing set to 7.5 kHz. MBSFN reference signals (depicted as $R_4$ resource elements for an antenna port 4) are mapped to subframe 1020 for a CP that has a duration of approximately 33.33 μs. Each resource element $R_4$ is used for reference signal transmission on a PMCH antenna port.

As depicted in FIG. 10A, each slot has 6 OFDMA symbols. Slot duration is 0.5 ms when the subcarrier spacing is 15 kHz. Consequently, each OFDMA symbol shown in FIG. 10A spans $$\frac{0.5}{6} \text{ ms,}$$

or approximately 83.33 µs, including a 16.67 µs extended CP. As depicted in FIG. 10B, each slot has 3 OFDMA symbols and an $R_4$ reference signals may be distributed according to a pattern calculated to improve channel estimation for systems using the slot format 1020. Slot duration is 0.5 ms when the subcarrier spacing is 7.5 kHz. Consequently, each OFDMA symbol shown in FIG. 10B spans $$\frac{0.5}{3} \text{ ms,}$$

or approximately 166.66 µs, including a CP having a duration of 33.33 µs. The CP overhead calculated as the percentage of ODFM symbol duration used by CP is 20% in both examples. Accordingly, the use of 7.5 kHz subcarrier spacing results in a CP duration that is twice the CP duration obtained using a 15 kHz subcarrier spacing without increasing CP overhead.

The 16.67 µs CP duration obtained using a 15 kHz spacing can accommodate a propagation delay associated with an eNB located at a distance of 5 km from the UE or with a propagation path between an eNB and the UE that has a length of 5 km. The 33.33 µs CP duration described above in relation to the use of a 7.5 kHz subcarrier spacing can accommodate a propagation delay associated with an eNB located at a distance of 10 km from the UE or a propagation delay that corresponds to a propagation path that has a length of 10 km. It will be appreciated that FFT size may be increased to obtain the same bandwidth for systems that use different subcarrier spacing. For example, the FFT size used for 7.5 kHz subcarrier spacing may be double the FFT size used in a 15 kHz subcarrier spacing. It will be appreciated that an increase FFT size may result in increased computational complexity.

The UE may receive signals from high power eNBs within the MBSFN area transmitting from much greater distances than 10 km. High power eNBs may have transmission power set to 80 kW or more. The presence of such high power transmitters in an MBSFN area may require even greater increases in CP duration to accommodate direct and indirect propagation paths between the eNBs and UEs in the MBSFN. In one example, CP duration may be increased to 66.67 µs. Subcarrier spacing may be reduced to 3.75 kHz to maintain a relatively low CP overhead.

Reductions in subcarrier spacing can result in a reduction in bandwidth unless FFT size is changed. Bandwidth may be calculated as the product of FFT size and subcarrier spacing. FFT size can be selected to provide a desired system bandwidth. In some embodiments, bandwidth may be reduced to maintain a desired maximum FFT size and thereby reduce computational complexity. FFT size typically is a power-of-two number (i.e. FFT size=$2^n$) and increases in FFT size may cause an exponential increase in computational complexity. LTE defines a 20 MHz reception capability at 15 kHz subcarrier spacing using an FFT size of 2048 which may yield a maximum bandwidth of 30 MHz assuming no guard band is used. With a guard band, the usable bandwidth may be lower than 30 MHz, e.g., 20 MHz. In some embodiments, an FFT size of 2048 may be considered computationally sustainable because certain LTE equipment may be required to handle an FFT size of 2048. In some embodiments, computationally sustainable FFT sizes may be larger or smaller than the 2048 FFT size.

When subcarrier spacing is reduced, the FFT size may be adjusted to obtain a desired bandwidth. FFT size may be increased by a factor of 2 over the 2048 FFT size used to obtain the 20 MHz bandwidth required for LTE with a subcarrier spacing of 15 kHz. Increases in FFT size may result in exponential increases in computational complexity. Consequently, a determination of subcarrier spacing may balance computational complexity with bandwidth requirements when extended CP duration is employed.

Certain embodiments reduce bandwidth for eMBMS transmissions to maintain an FFT size less that a predefined maximum size (e.g., 2048) and to improve computational efficiency. As noted, increases in FFT size can increase processing complexity exponentially when subcarrier spacing is reduced and CP duration is increased. Transmission bandwidth may be calculated as the product of the number of subcarriers and the subcarrier spacing. In one example, eMBMS transmission bandwidth of 2048×2.5 kHz=5.12 MHz may be obtained using 2048-point FFT size for a subcarrier spacing of 2.5 KHz, if no guard band is used, while maintaining CP duration of 66.66 µs.

FIG. 11 illustrates possible assignments of resource elements used for MBSFN reference signal transmission when subcarrier spacing is reduced below 7.5 kHz. A distribution pattern for reference signals within a slot may be selected to improve channel estimations. The $R_4$ elements may be distributed to maximize separation between neighboring $R_4$ elements. FIG. 11 relates to embodiments having subcarrier spacing set to 1.875 kHz. MBSFN reference signals (depicted as $R_4$ resource elements for an antenna port 4) are mapped to subframe 1100 which may be used when a CP duration of approximately 66.67 µs is desired. A CP duration of 66.67 µs may extend protection from inter-symbol interference related to high power eNBs transmitting from a distance of up to 20 km. Each of patterns 1100, 1102, 1104 may be used when the TTI corresponds to a TTI duration of 1 ms. The TTI may be determined by subframe duration. A different TTI duration may be used to accommodate a better pilot design. The pattern used in subframe 1100 has a 12.5% RS overhead. Subframes 1102 and 1104 have higher RS density and correspondingly increased RS overhead. The pattern 1106 may be used when the TTI is 2 ms. A TTI duration of 2 ms may be configured to provide a better RS distribution over a larger frame size and lower RS overhead. For example, the pattern used in subframe 1106 has a 12.5% RS overhead.

CP duration may be increased to 133.3 µs using subcarrier spacing of 1.875 kHz and increasing TTI length from 1 ms to 2 ms to maintain a lower CP overhead and improve channel estimation efficiency. Maximum supportable bandwidth without adding a guard band may be calculated as 1.875 kHz×2048=3.84 MHz with a 2048-point FFT size. In one example, an LTE system may be deployed using 1200 subcarriers to obtain 2.25 MHz usable bandwidth.

FIG. 12 provides another example illustrating assignment of resource elements used for MBSFN reference signal transmission when subcarrier spacing is reduced below 7.5 kHz. The resource element distributions including MBSFN reference signals (depicted as $R_4$ resource elements for an antenna port 4) that are shown in FIG. 12 may be used in embodiments where subcarrier spacing is set to 2.5 kHz. Subframe 1220 may be used when a CP duration of approximately 100 µs is desired. A CP duration of 100 µs may extend protection from inter-symbol interference related to high power eNBs transmitting from a distance of up to 30 km using 2.5 kHz subcarrier spacing. Each of patterns 1220, 1222, 1224 may be used when the TTI, which corresponds to the subframe duration, is 1 ms. Pattern 1226 may be used when the TTI is 2 ms. A TTI duration of 2 ms may be configured to provide a improved spacing for reference signals. Patterns 1222 and 1224 may have higher RS density than patterns 1220 and 1226 and correspondingly increased RS overhead than patterns 1220 and 1226. Maximum supportable bandwidth without adding a guard band using the embodiment 1220 can be calculated as 2.5 kHz×2048=5.12 MHz, using a 2048-point FFT size for a subcarrier spacing of 2.5 KHz. An LTE system that uses 1200 subcarriers may obtain 3 MHz of usable bandwidth. In this case, the symbol duration may be $$\left(\frac{1\text{ s}}{2500} + 100\text{ }\mu s\right) = 500\text{ }\mu s,$$

with the resulting 500 μs slot duration having 2 OFDMA symbols per subframe. (see FIG. 12).

The selection of carrier spacing may be based on other characteristics of the MBSFN. Decreases in subcarrier spacing may result in reduced tolerance of Doppler effects that can occur when a UE is moving with respect to an eNB. Doppler effects may become problematic as the velocity of the UE increases, thereby causing frequency variations that are a sizable portion of subcarrier spacing. Doppler effects can cause channel variations which result in inter-subcarrier interference due to loss of subcarrier orthogonality. For a carrier frequency $f_o$ (e.g. 2 GHz), and a UE that is moving towards or away from an eNB at a velocity of $v_{UE}$, the Doppler spread $f_{doppler}$ for $f_o$ can be calculated as $$f_{doppler} = \frac{v_{UE}}{c} f_o$$

where c is the speed of light. A coherence time for a channel may be estimated using a factor applied to the inverse of the Doppler spread, $$\left(\text{e.g. }\frac{0.1}{f_{doppler}}\right).$$

Thus, increasing subcarrier spacing increases coherence time. The term "Doppler resistance" may refer to the tolerance of the channel to Doppler effects.

Doppler resistance for 15 kHz subcarrier spacing may be twice the Doppler resistance for 7.5 kHz subcarrier spacing. With 7.5 kHz subcarrier spacing, the channel is required to stay constant for over $$\frac{500\text{ }\mu s}{3} = 167\text{ }\mu s.$$

In a 2 GHz system, however, the coherence time is roughly 180 μs when a UE is moving at 300 km per hour towards or away from an eNB. Certain high speed trains are known to exceed 300 km per hour.

Certain embodiments may provide a channel in the 2 GHz band that can be sustained at a UE speed of 100 km per hour by using 2.5 kHz subcarrier spacing and OFDMA symbol length of 500 μs. A channel may be considered to be sustainable when its channel response remains substantially constant while the UE is in motion. In one example, a sustainable channel in the 2 GHz band may be maintained at a UE speed of 75 km per hour in the 2 GHz band using 1.875 kHz subcarrier spacing and an OFDMA symbol duration of 667 μs. Certain aspects of the embodiments described herein may be used for carrier aggregation where eMBMS is deployed over 5 MHz carriers, since LTE does not support FDM between UNICAST and eMBMS within the same carrier.

In some embodiments, selection of CP duration for an MBSFN may include consideration of the balance between fast moving UEs and the desirability of covering high power distant eNBs in the MBSFN. Expected velocity of UEs traversing the MBSFN and other factors such as channel quality and consistency across the MBSFN may also be considered.

In some embodiments, CP duration selection may prioritize delay spread associated with the presence of high powered eNBs in the MBSFN and a reduction of CP overhead and reduce subcarrier spacing accordingly. CP overhead may reduced by increasing OFDMA symbol duration in the MBSFN. Bandwidth may be reduced to maintain computational efficiency, by keeping FFT size below a predefined size, for example. In some embodiments, increased bandwidth may be achieved in the MBSFN by increasing FFT size.

In some embodiments, the selection of bandwidth and subframe duration may assign more weight to the consideration of the operational needs of large majorities of stationary or near-stationary UEs than to small minorities of high velocity UEs. In some embodiments, reductions in subcarrier spacing may be limited to maintain a minimum Doppler resistance.

Figure 13:
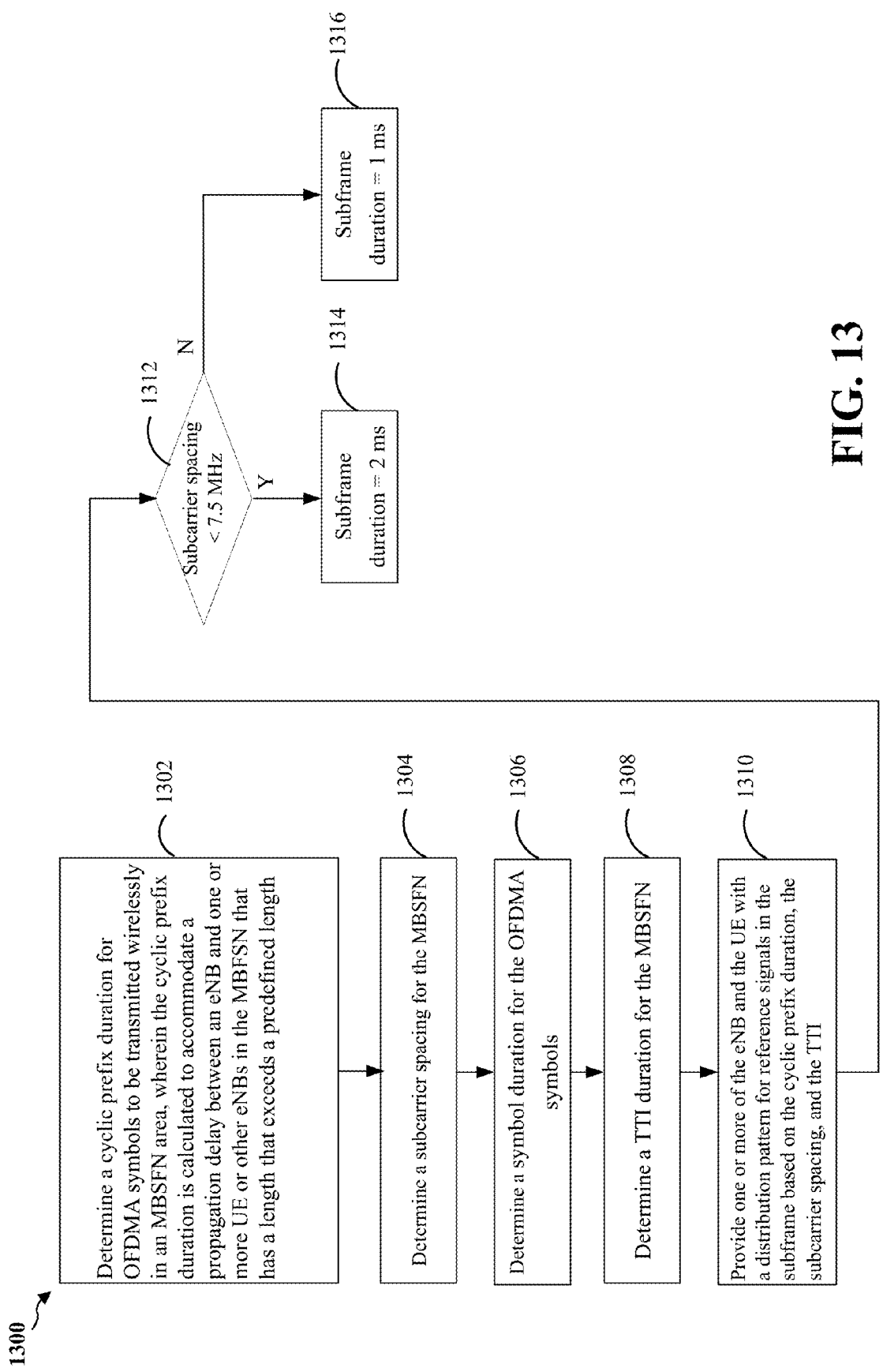
FIG. 13 is a flow chart of a method of wireless communication.

FIG. 13 is a flow chart 1300 of a method of wireless communication. The method may be performed by one or more eNBs. At step 1302, the eNB determines a cyclic prefix duration for OFDMA symbols to be transmitted wirelessly in an MBSFN area, wherein the cyclic prefix duration is calculated to accommodate a propagation delay between an eNB and one or more UE or other eNBs in the MBSFN that is associated with a propagation path that has a length exceeding a predefined length. The propagation delay may be accommodated by extending CP duration to allow signals received with significant power to be coherently combined to provide MBSFN gain at the receiver. Accommodating propagation delay may include increasing CP duration to avoid inter-symbol interference caused by delayed signals that are received with power levels significantly above the power levels of channel noise. The predefined duration may be associated with a propagation path that exceeds 5 km and may be associated with an eNB transmitting from a distance with increased power (e.g. 80 kW) with respect to other eNBs in the MBSFN which may have transmission powers of between 10 W and 40 W. The CP may be selected based on expected channel conditions, UE deployment and motion and the presence or absence of high-transmit power distant eNB. Examples of CP duration may include approximate durations of 33.33 μs, 66.67 μs, 133.33 μs, 266.67 μs, and other durations. The cyclic prefix may be determined based on transmission power of an eNB associated with the maximum propagation path length.

At step 1304, a network entity, such as an eNB, OAM, or MCE, configures a subcarrier spacing for the MBSFN. The subcarrier spacing may be 7.5 MHz or less. The subcarrier spacing may be, for example, 3.75 MHz, 2.5 MHz, 1.875 MHz, or some other spacing. The network entity may additionally configure a subframe length that increases as subcarrier spacing decreases. In some embodiments, the eNB may configure FFT size based on the number of subcarriers and the subcarrier spacing. The FFT size may be calculated to obtain a desired minimum bandwidth and/or for computational efficiency. In some embodiments, computational efficiency may be achieved with FFT size of 2048 or less (UE implementation constraints may limit the maximum FFT size). The system may have a reduced bandwidth when subcarrier spacing is reduced for the purpose of maintaining computational efficiency, for example.

At step 1306, network entity configures a symbol duration for the OFDMA symbols. Symbol duration may be selected in order to reduce the overhead associated with the CP duration. For example, the duration of the OFDMA symbols may be selected to maintain CP overhead at 20% of the symbol duration. The symbol duration may be determined based on a combination of subcarrier spacing and TTI. One or more of subframe size, subcarrier spacing and the symbol duration may be configured to obtain a minimum Doppler resistance. Doppler resistance may be a measure of susceptibility to Doppler effects on carrier signals when a transmitter and receiver are in relative motion. In some embodiments, subcarrier spacing may be increased to increase Doppler resistance to UEs that may have a velocity relative to an eNB that exceeds 10 kilometers per hour, 80 kilometers per hour, and 300 kilometers per hour.

At step 1308, the network entity configures a TTI duration for the MBSFN. A higher TTI duration may be configured when subcarrier spacing is reduced. For example, TTI may be set to 2 ms to enable efficient channel estimations by allowing an improved MBSFN reference signal throughout the subframe (see FIGS. 11 and 12) when subcarrier spacing is reduced below 5.5 kHz. TTI may be set to 1 ms for subcarrier spacing that exceed 7.5 kHz.

At step 1310, the network entity may provide one or more of the eNB and the UE with a distribution pattern for reference signals in the subframe based on the cyclic prefix duration, the subcarrier spacing, and the TTI. The distribution pattern may be based on separation between neighboring reference signals within the subframe. The network entity may configure one or more of the eNB and the UE with the cyclic prefix duration, the subcarrier spacing, the OFDMA symbol duration, and the TTI duration. The eNB may receive the pattern and/or the configuration from another eNB or from other network equipment, such as a quadrature amplitude modulator or an MCE. The eNB may configure itself. The network entity may dynamically change one or more of the CP duration, the subcarrier spacing and the OFDMA symbol size. The eNB may perform the configuration of other eNBs and/or UE using a configuration and/or pattern received from a network.

At step 1312, the network entity may determine if the subcarrier spacing is configured to a value less than 7.5 MHz.

At step 1314, the network entity may optionally configure a subframe duration of 2 ms when the subcarrier spacing is less than 7.5 kHz.

Finally, at step 1316, the network entity may optionally configure a subframe duration of 1 ms when the subcarrier spacing is 7.5 MHz or more. The network entity may configure a longer subframe duration in order to double the CP duration without increasing CP overhead.

Figure 14:
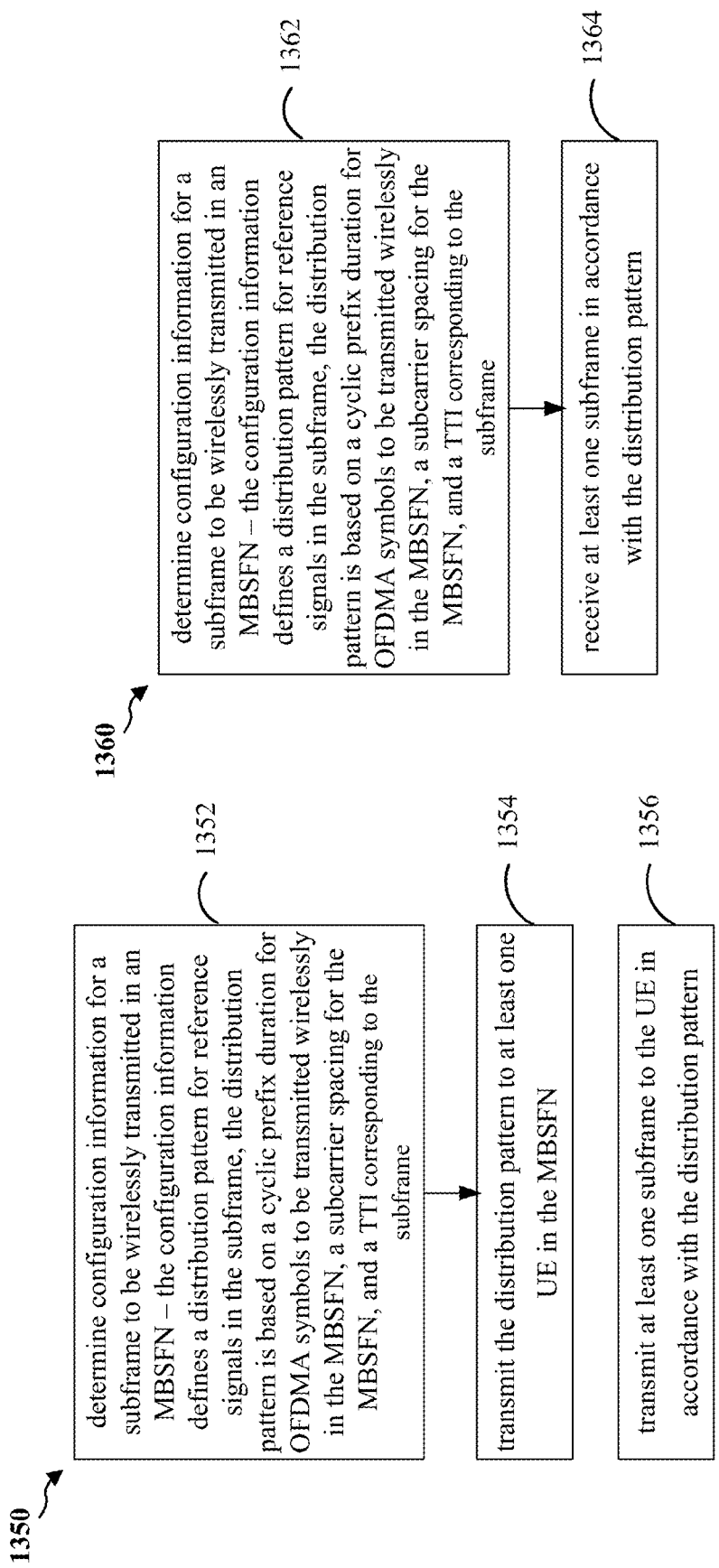
FIG. 14 provides flow charts of methods of wireless communication.

FIG. 14 provides flow charts 1350, 1360 of methods of wireless communication.

In the flow chart of 1350, at step 1352, an eNB determines configuration information for a subframe to be wirelessly transmitted in an MBSFN. The configuration information defines a distribution pattern for reference signals in the subframe. The distribution pattern is based on a cyclic prefix duration for OFDMA symbols to be transmitted wirelessly in the MBSFN, a subcarrier spacing for the MBSFN, and a TTI corresponding to the subframe. At step 1354, the eNB transmits the distribution pattern to at least one UE in the MBSFN.

At step 1356, the eNB transmits at least one subframe to the UE in accordance with the distribution pattern. The cyclic prefix duration may be calculated to accommodate a propagation delay between the UE and the eNB that has a duration that exceeds a predefined duration. The distribution pattern may be further based on separation between neighboring reference signals within the subframe.

In the flow chart of 1360, at step 1362, a UE determines configuration information for a subframe to be wirelessly transmitted in an MBSFN. The configuration information defines a distribution pattern for reference signals in the subframe. The distribution pattern is based on a cyclic prefix duration for OFDMA symbols to be transmitted wirelessly in the MBSFN, a subcarrier spacing for the MBSFN, and a TTI corresponding to the subframe. At step 1364, the UE receives at least one subframe in accordance with the distribution pattern.

Figure 15:
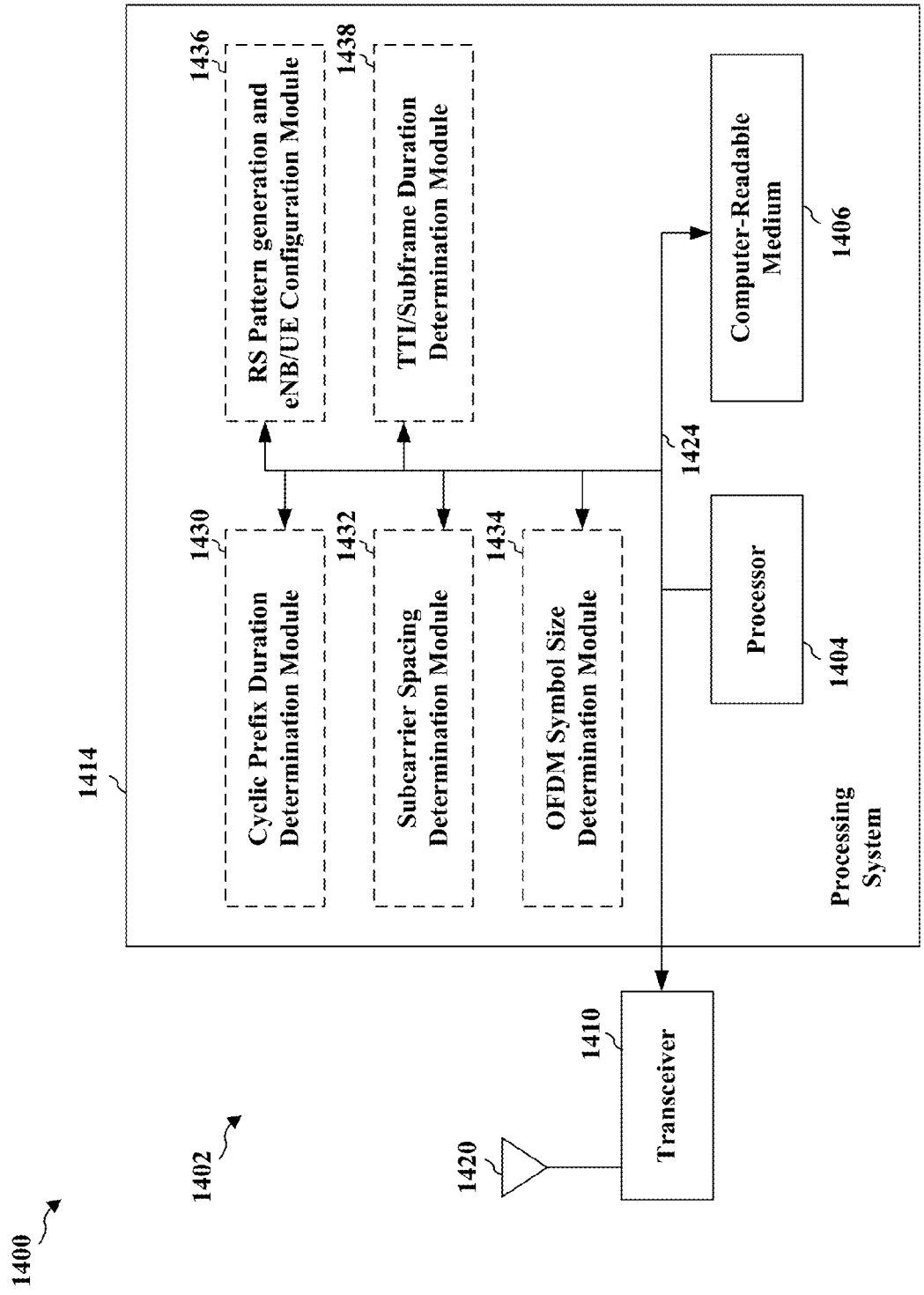
FIG. 15 is a diagram illustrating an example of a hardware implementation for an apparatus employing a processing system.

FIG. 15 is a diagram 1400 illustrating an example of a hardware implementation for an apparatus 1402 employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1430, 1432, 1434, 1436, 1438, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1430, 1432, 1434, 1436, and 1438. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1402 for wireless communication includes means for determining a cyclic prefix duration for OFDMA symbols to be transmitted wirelessly in an MBSFN area, wherein the cyclic prefix duration is calculated to accommodate a propagation delay between an eNB and one or more UE or other eNBs in the MBSFN that has a duration that exceeds a predefined duration. Propagation delay may be accommodated by extending CP duration to integrate signals received with significant power that contribute to the MBSFN gain at the receiver. Accommodating propagation delay may include increasing CP duration to avoid inter-symbol interference caused by delayed signals that are received with power levels significantly above the power levels of channel noise. The predefined duration may be associated with a propagation path length, or difference in propagation path length that exceeds 5 km. In one example, the CP duration may be associated with an eNB transmitting from a distance with increased power (e.g. 80 kW) with respect to other eNBs in the MBSFN which may have a transmission power of between 10 W and 40 W. The CP may be selected based on expected channel conditions, UE deployment and motion and the presence or absence of high-transmit power distant eNB. Examples of CP duration may include approximate durations of 33.33 µs, 66.67 µs, 133.33 µs, 266.67 µs, and other durations.

Apparatus 1402 may provide means for determining a subcarrier spacing for the MBSFN. The subcarrier spacing may be 7.5 MHz or less. The subcarrier spacing may be, for example, 3.75 MHz, 2.5 MHz, 1.875 MHz, or some other spacing. The UE may additionally configure a subframe length that increases as subcarrier spacing decreases. In some embodiments, the eNB may configure FFT size based on the number of subcarriers and the subcarrier spacing. The FFT size may be calculated to obtain a desired minimum bandwidth and/or for computational efficiency. In some embodiments, computational efficiency may be achieved with FFT size of 2048 or less. The UE may limit FFT size and thereby provide reduced bandwidth when subcarrier spacing is reduced for the purpose of maintaining computational efficiency, for example.

Apparatus 1402 may provide means for determining a symbol duration for the OFDMA symbols. The symbol duration may be selected in order to reduce the overhead associated with the CP duration. For example, the duration of the OFDMA symbols may be selected to maintain CP overhead at 20% of the symbol duration. The symbol duration may be determined based on a combination of subcarrier spacing and TTI. One or more of subframe size, subcarrier spacing and the symbol duration may be configured to obtain a minimum Doppler resistance. Doppler resistance may be a measure of susceptibility to Doppler effects on carrier signals when a transmitter and receiver are in relative motion. In some embodiments, subcarrier spacing may be increased to increase Doppler resistance. UEs may have a velocity relative to an eNB that exceeds 10 kilometers per hour, 80 kilometers per hour, and 300 kilometers per hour.

Apparatus 1402 may provide means for determining a TTI duration for the MBSFN. A higher TTI duration may be configured when subcarrier spacing is reduced. For example, TTI may be set to 2 ms to enable efficient channel estimations by allowing improved $R_4$ distribution throughout the subframe (see FIGS. 11 and 12) when subcarrier spacing is reduced below 5.5 kHz. TT may be set to 1 ms for subcarrier spacing that exceed 7.5 kHz.

Apparatus 1402 may provide means for configuring one or more of the eNB and the UE with the cyclic prefix duration, the subcarrier spacing, the OFDMA symbol duration, and the TTI duration. The eNB may receive the configuration from another eNB or from other network equipment. The eNB may configure itself. The eNB may dynamically change one or more of the CP duration, the subcarrier spacing and the OFDMA symbol size. The eNB may perform the configuration of other eNBs and/or UE using a configuration received from a network.

In one configuration, the apparatus 1402 may include means for determining configuration information for a subframe to be wirelessly transmitted in an MBSFN. The configuration information defines a distribution pattern for reference signals in the subframe. The distribution pattern is based on a cyclic prefix duration for OFDMA symbols to be transmitted wirelessly in the MBSFN, a subcarrier spacing for the MBSFN, and a TTI corresponding to the subframe. The apparatus may further include means for transmitting the distribution pattern to at least one UE in the MBSFN. The apparatus may further include means for transmitting at least one subframe to the UE in accordance with the distribution pattern.

In one configuration, the apparatus 1402 may include means for determining configuration information for a subframe to be wirelessly transmitted in an MBSFN. The configuration information defines a distribution pattern for reference signals in the subframe. The distribution pattern is based on a cyclic prefix duration for OFDMA symbols to be transmitted wirelessly in the MBSFN, a subcarrier spacing for the MBSFN, and a TTI corresponding to the subframe. The apparatus may further include means for receiving at least one subframe in accordance with the distribution pattern.

The aforementioned means may be one or more of the aforementioned modules of the apparatus 1402 and/or the processing system 1414 of the apparatus 1402 configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 16:
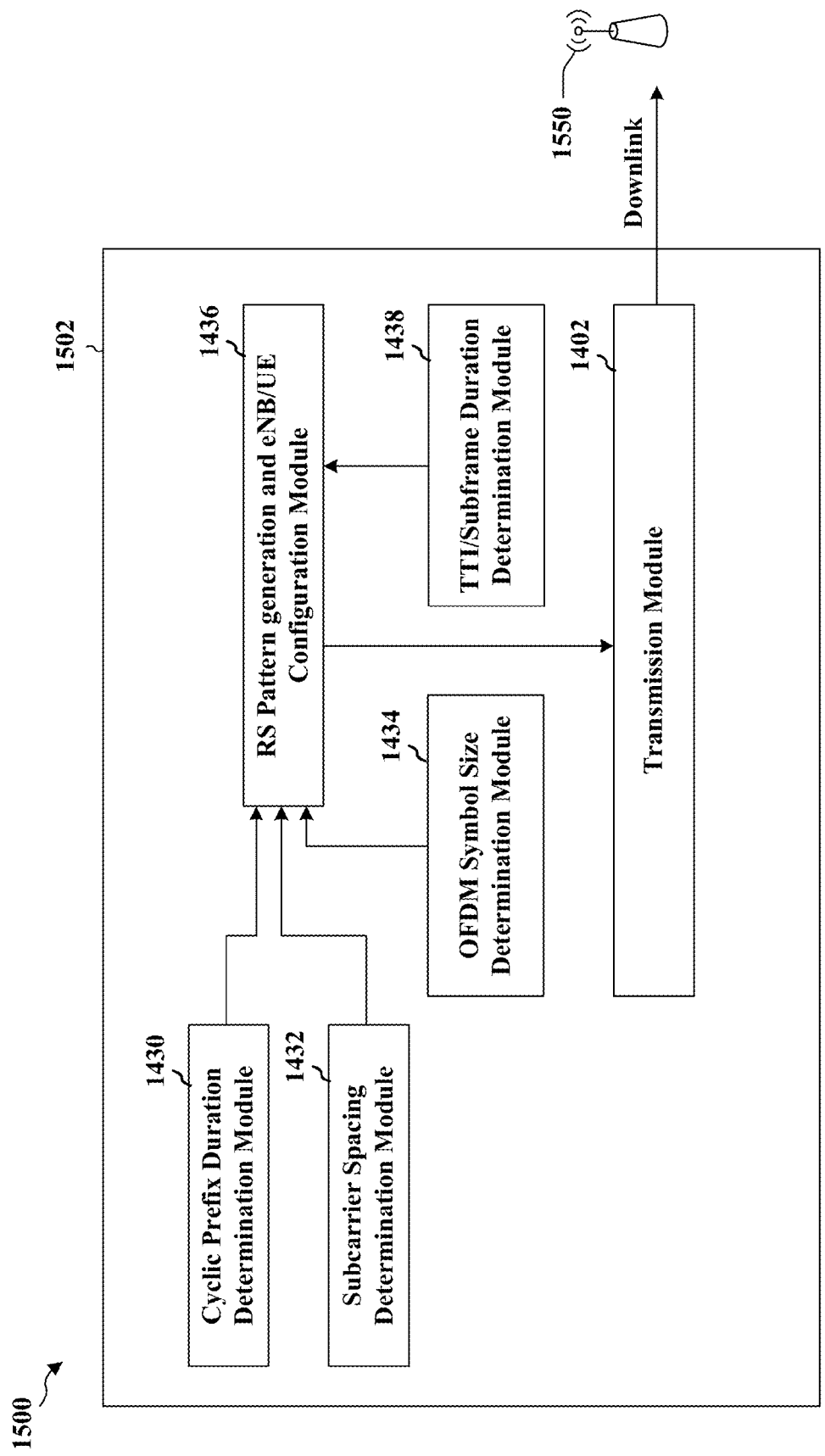
FIG. 16 is a conceptual data flow diagram illustrating the data flow between different modules/means/components in an exemplary apparatus

FIG. 16 is a conceptual data flow diagram 1500 illustrating the data flow between different modules/means/components in an exemplary apparatus 1502. The apparatus may be an eNB or other network entity. The apparatus includes a module 1430 that determines a cyclic prefix duration for OFDMA symbols to be transmitted wirelessly in an MBSFN area, a module 1432 that determines a subcarrier spacing for the MBSFN, a module 1434 that determines OFDM symbol size, a module 1438 that determines a TTI corresponding to a subframe transmitted in the MBSFN, and a module 1436 that generates and/or provides one or more of the eNB and the UE with a distribution pattern for reference signals in the subframe, whereby a module 1402 may format and transmit data to the provides one or more of the eNB and the UE.

The apparatus may include additional modules that perform each of the steps of the algorithm in the aforementioned flow charts of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to accommodate a propagation delay between an evolved Node B (eNB) and one or more user equipment (UE) or other eNBs in the MBSFN that has a duration that exceeds a predefined duration;
    determining a subcarrier spacing for the MBSFN;
    determining a transmission time interval (TTI) corresponding to an MBSFN subframe transmitted in the MBSFN;
    determining, based on the cyclic prefix duration, the subcarrier spacing, and the TTI, a distributed pattern for reference signals in an MBSFN subframe configuration; and
    providing one or more of the eNB and the UE with the MBSFN subframe configuration for communicating the MBSFN subframe.

2. The method of claim 1, wherein the distribution pattern is further based on separation between neighboring reference signals within the MBSFN subframe.

3. The method of claim 1, further comprising configuring a plurality of eNBs with the distribution pattern, wherein the eNBs participate in the same MBSFN.

4. The method of claim 1, wherein the cyclic prefix duration is greater than 33 microseconds.

5. The method of claim 1, wherein the subcarrier spacing is less than 7.5 kHz.

6. The method of claim 1, further comprising determining a symbol duration for the OFDMA symbols, wherein the distribution pattern is further based on the symbol duration.

7. The method of claim 6, wherein configuring the symbol duration includes reducing bandwidth to obtain a sustainable FFT size.

8. A method of wireless communication, comprising:
    determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to accommodate a propagation delay between an evolved Node B (eNB) and one or more user equipment (UE) or other eNBs in the MBSFN that has a duration that exceeds a predefined duration;
    determining a subcarrier spacing for the MBSFN;
    determining a transmission time interval (TTI) corresponding to a subframe transmitted in the MBSFN; and
    providing one or more of the eNB and the UE with a distribution pattern for reference signals in the subframe based on the cyclic prefix duration, the subcarrier spacing, and the TTI, wherein the TTI is 1 ms when the subcarrier spacing is 7.5 MHz or more.

9. A method of wireless communication, comprising:
    determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to accommodate a propagation delay between an evolved Node B (eNB) and one or more user equipment (UE) or other eNBs in the MBSFN that has a duration that exceeds a predefined duration;
    determining a subcarrier spacing for the MBSFN;
    determining a transmission time interval (TTI) corresponding to a subframe transmitted in the MBSFN; and
    providing one or more of the eNB and the UE with a distribution pattern for reference signals in the subframe based on the cyclic prefix duration, the subcarrier spacing, and the TTI, wherein the TTI is greater than 1 ms when the subcarrier spacing is less than 7.5 kHz.

10. An apparatus for wireless communication, comprising:
    means for determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;
    means for determining a subcarrier spacing for the MBSFN;
    means for determining a transmission time interval (TTI) corresponding to an MBSFN subframe transmitted in the MBSFN;
    means for determining, based on the cyclic prefix duration, the subcarrier spacing, and the TTI, a distributed pattern for reference signals in a MBSFN subframe configuration; and
    means for providing one or more of the eNB and the UE with the MBSFN subframe configuration for communicating the MBSFN subframe.

11. The apparatus of claim 10, wherein the distribution pattern is further based on separation between neighboring reference signals within the MBSFN subframe.

12. The apparatus of claim 10, further comprising means for configuring a plurality of eNBs with the distribution pattern, wherein the eNBs participate in the same MBSFN.

13. The apparatus of claim 10, wherein the cyclic prefix duration is greater than 33 microseconds.

14. The apparatus of claim 10, wherein the subcarrier spacing is less than 7.5 kHz.

15. The apparatus of claim 10, further comprising means for determining a symbol duration for the OFDMA symbols, wherein the distribution pattern is further based on the symbol size.

16. The apparatus of claim 15, wherein the means for determining the symbol duration reduces bandwidth to obtain a sustainable FFT size.

17. An apparatus for wireless communication, comprising:
    means for determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;

means for determining a subcarrier spacing for the MBSFN;

means for determining a transmission time interval (TTI) corresponding to a subframe transmitted in the MBSFN; and means for providing one or more of the eNB and the UE with a distribution pattern for reference signals in the subframe based on the cyclic prefix duration, the subcarrier spacing, and the TTI, wherein the transmission time interval (TTI) is 1 ms when the subcarrier spacing is 7.5 MHz or more.

18. An apparatus for wireless communication, comprising:

means for determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;

means for determining a subcarrier spacing for the MBSFN;

means for determining a transmission time interval (TTI) corresponding to a subframe transmitted in the MBSFN; and means for providing one or more of the eNB and the UE with a distribution pattern for reference signals in the subframe based on the cyclic prefix duration, the subcarrier spacing, and the TTI, wherein the TTI is greater than 1 ms when the subcarrier spacing is less than 7.5 kHz.

19. An apparatus for wireless communication, comprising:

a processing system configured to:

determine a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;

determine a subcarrier spacing for the MBSFN;

determine a transmission time interval (TTI) corresponding to an MBSFN subframe transmitted in the MBSFN;

determine, based on the cyclic prefix duration, the subcarrier spacing, and the TTI, a distributed pattern for reference signals in an MBSFN subframe configuration; and provide one or more of the eNB and the UE with the MBSFN subframe configuration for communicating the MBSFN subframe.

20. The apparatus of claim 19, wherein the distribution pattern is further based on separation between neighboring reference signals within the MBSFN subframe.

21. The apparatus of claim 19, wherein the processing system is configured to configure a plurality of eNBs with the distribution pattern, wherein the eNBs participate in the same MBSFN.

22. The apparatus of claim 19, wherein the cyclic prefix duration is greater than 33 microseconds.

23. The apparatus of claim 19, wherein the subcarrier spacing is less than 7.5 kHz.

24. The apparatus of claim 19, wherein the processing system is configured to determine a symbol duration for the OFDMA symbols, wherein the distribution pattern is further based on the symbol duration.

25. The apparatus of claim 24, wherein the symbol duration is configured by reducing bandwidth to obtain a sustainable FFT size.

26. An apparatus for wireless communication, comprising:

a processing system configured to:

determine a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;

determine a subcarrier spacing for the MBSFN;

determine a transmission time interval (TTI) corresponding to a subframe transmitted in the MBSFN; and provide one or more of the eNB and the UE with a distribution pattern for reference signals in the subframe based on the cyclic prefix duration, the subcarrier spacing, and the TTI, wherein the TTI is 1 ms when the subcarrier spacing is 7.5 MHz or more.

27. An apparatus for wireless communication, comprising:

a processing system configured to:

determine a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;

determine a subcarrier spacing for the MBSFN;

determine a transmission time interval (TTI) corresponding to a subframe transmitted in the MBSFN; and provide one or more of the eNB and the UE with a distribution pattern for reference signals in the subframe based on the cyclic prefix duration, the subcarrier spacing, and the TTI, wherein the TTI is greater than 1 ms when the subcarrier spacing is less than 7.5 kHz.

28. A non-transitory computer-readable medium comprising code for:

determining a cyclic prefix duration for orthogonal frequency division multiple access (OFDMA) symbols to be transmitted wirelessly in a multi-media broadcast over a single frequency network (MBSFN) area, wherein the cyclic prefix duration is calculated to reduce inter-symbol interference associated with a propagation delay between an evolved Node B (eNB) and one or more user equipment (UE) or other eNBs in the MBSFN that has a duration that exceeds a predefined duration;

determining a subcarrier spacing for the MBSFN;

determining a transmission time interval (TTI) corresponding to an MBSFN subframe transmitted in the MBSFN;

determining, based on the cyclic prefix duration, the subcarrier spacing, and the TTI, a distributed pattern for reference signals in an MBSFN subframe configuration; and providing one or more of the eNB and the UE with the MBSFN subframe configuration for communicating the MBSFN subframe.

29. A method of wireless communication, comprising:

determining configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe;

transmitting the distribution pattern to at least one user equipment (UE) in the MBSFN; and transmitting at least one MBSFN subframe to the UE in accordance with the distribution pattern.

30. The method of claim 29, wherein the cyclic prefix duration is calculated to accommodate a propagation delay between the UE and an evolved Node B (eNB) that has a duration that exceeds a predefined duration.

31. The method of claim 29, wherein the distribution pattern is further based on separation between neighboring reference signals within the subframe.

32. An apparatus for wireless communication, comprising:

means for determining configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe;

means for transmitting the distribution pattern to at least one user equipment (UE) in the MBSFN; and means for transmitting at least one MBSFN subframe to the UE in accordance with the distribution pattern.

33. The apparatus of claim 32, wherein the cyclic prefix duration is calculated to accommodate a propagation delay between the UE and an evolved Node B (eNB) that has a duration that exceeds a predefined duration.

34. The apparatus of claim 32, wherein the distribution pattern is further based on separation between neighboring reference signals within the subframe.

35. An apparatus for wireless communication, comprising:
a processing system configured to:

determine configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe;

transmit the distribution pattern to at least one user equipment (UE) in the MBSFN; and transmit at least one MBSFN subframe to the UE in accordance with the distribution pattern.

36. The apparatus of claim 35, wherein the cyclic prefix duration is calculated to accommodate a propagation delay between the UE and an evolved Node B (eNB) that has a duration that exceeds a predefined duration.

37. The apparatus of claim 35, wherein the distribution pattern is further based on separation between neighboring reference signals within the subframe.

38. A non-transitory computer-readable medium comprising code for:

determining configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe;

transmitting the distribution pattern to at least one user equipment (UE) in the MBSFN; and transmitting at least one MBSFN subframe to the UE in accordance with the distribution pattern.

39. A method of wireless communication, comprising:

determining configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe; and receiving at least one MBSFN subframe in accordance with the distribution pattern.

40. The method of claim 39, wherein the distribution pattern is further based on separation between neighboring reference signals within the subframe.

41. An apparatus for wireless communication, comprising:

means for determining configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe; and means for receiving at least one MBSFN subframe in accordance with the distribution pattern.

42. The apparatus of claim 41, wherein the distribution pattern is further based on separation between neighboring reference signals within the subframe.

43. An apparatus for wireless communication, comprising:
a processing system configured to:
- determine configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe; and
- receive at least one MBSFN subframe in accordance with the distribution pattern.

44. The apparatus of claim 43, wherein the distribution pattern is further based on separation between neighboring reference signals within the subframe.

45. A non-transitory computer-readable medium comprising code for:

- determining configuration information for a subframe to be wirelessly transmitted in a multi-media broadcast over a single frequency network (MBSFN), the subframe being an MBSFN subframe, the configuration information defining a distribution pattern for reference signals in the subframe, wherein the distribution pattern is based on a cyclic prefix duration for orthogonal frequency division multiple access (OFDMA) symbols to be transmitted wirelessly in the MBSFN, a subcarrier spacing for the MBSFN, and a transmission time interval (TTI) corresponding to the subframe; and
- receiving at least one MBSFN subframe in accordance with the distribution pattern.

* * * * *